US012452933B2

(12) United States Patent
Cao et al.

(10) Patent No.: US 12,452,933 B2
(45) Date of Patent: Oct. 21, 2025

(54) REMOTE INTERFERENCE MANAGEMENT DESIGN

(71) Applicant: QUALCOMM Incorporated, San Diego, CA (US)

(72) Inventors: Yiqing Cao, Beijing (CN); Huilin Xu, San Diego, CA (US); Wanshi Chen, San Diego, CA (US); Yuwei Ren, Beijing (CN)

(*) Notice: Subject to any disclaimer, the term of this patent is extended or adjusted under 35 U.S.C. 154(b) by 554 days.

(21) Appl. No.: 17/275,617

(22) PCT Filed: Sep. 20, 2019

(86) PCT No.: PCT/CN2019/106841
§ 371 (c)(1),
(2) Date: Mar. 11, 2021

(87) PCT Pub. No.: WO2020/057621
PCT Pub. Date: Mar. 26, 2020

(65) Prior Publication Data
US 2022/0053556 A1 Feb. 17, 2022

(30) Foreign Application Priority Data
Sep. 21, 2018 (WO) ................ PCT/CN2018/106856

(51) Int. Cl.
*H04W 74/0833* (2024.01)
*H04B 17/336* (2015.01)
(Continued)

(52) U.S. Cl.
CPC ........ *H04W 74/085* (2013.01); *H04B 17/336* (2015.01); *H04L 5/0051* (2013.01);
(Continued)

(58) Field of Classification Search
CPC ............... H04W 74/085; H04W 24/08; H04W 72/0446; H04W 74/0866; H04B 17/336
See application file for complete search history.

(56) References Cited

U.S. PATENT DOCUMENTS

2013/0114447 A1 5/2013 Luo et al.
2014/0073368 A1 3/2014 Teyeb et al.
(Continued)

FOREIGN PATENT DOCUMENTS

CN 103327599 A 9/2013
CN 103458435 A 12/2013
(Continued)

OTHER PUBLICATIONS

CMCC: "Draft summary on Study on NR-RIM", R1-1809865, 3GPP TSG RAN WG1 Meeting #94, Aug. 20-24, 2018, Gothenburg, Sweden, Aug. 24, 2018, 30 Pages, Sections 1-2.
(Continued)

Primary Examiner — Jackie Zuniga Abad

(57) ABSTRACT

Certain aspects of the present disclosure provide techniques for performing remote interference management. In certain embodiments, a method includes detecting interference from one or more aggressor BSs. The method further includes transmitting distinguishable victim reference signals (RSs). The method further includes. The method further includes monitoring for distinguishable aggressor RSs from the aggressor BSs. The method further includes determining to stop transmitting one or more of the distinguishable victim RSs based on the monitoring.

33 Claims, 20 Drawing Sheets

(51) Int. Cl.
  *H04L 5/00* (2006.01)
  *H04W 24/08* (2009.01)
  *H04W 72/0446* (2023.01)
  *H04W 74/08* (2009.01)

(52) U.S. Cl.
  CPC ....... *H04W 24/08* (2013.01); *H04W 72/0446* (2013.01); *H04W 74/0866* (2013.01)

(56) References Cited

U.S. PATENT DOCUMENTS

| | | | | |
|---|---|---|---|---|
| 2015/0189666 | A1* | 7/2015 | Wang | H04W 72/54 370/329 |
| 2018/0270039 | A1* | 9/2018 | Zhang | H04W 16/10 |
| 2020/0044764 | A1* | 2/2020 | Xu | H04L 5/0048 |
| 2021/0321417 | A1* | 10/2021 | Kim | H04L 5/0048 |
| 2022/0046432 | A1* | 2/2022 | Li | H04W 24/02 |

FOREIGN PATENT DOCUMENTS

| | | |
|---|---|---|
| CN | 104919866 A | 9/2015 |
| CN | 105517044 A | 4/2016 |
| WO | 2013177774 | 12/2013 |

OTHER PUBLICATIONS

Ericsson: "Power Control for V2V Adjacent Co-existence in Licensed Bands," 3GPP TSG-RAN WG4 Meeting #80, R4-165594, Aug. 26, 2016, 5 pages.

International Search Report and Written Opinion—PCT/CN2018/106856—ISA/EPO—Jun. 19, 2019.

International Search Report and Written Opinion—PCT/CN2019/106841—ISA/EPO—Dec. 20, 2019.

LG Electronics: "Discussions on mechanism for NR RIM support",3GPP Draft; R1-1808529, 3GPP TSG RAN WG1 Meeting #94, 3rd Generation Partnership Project (3GPP), Mobile Competence Centre, 650, Route Des Lucioles, F-06921 Sophia-Antipolis Cedex France, vol. RAN WG1, No. Gothenburg, Sweden; Aug. 20, 2018-Aug. 24, 2018, Aug. 11, 2018 (Aug. 11, 2018), pp. 1-8, XP051515907, Retrieved from the Internet:URL:http://www.3gpp.org/ftp/tsg%5Fran/WG1%5FRL1/TSGR1%5F94/Docs/R1%2D1808529%2Ezip, Sections 1-4.

LG Electronics: "Discussions on Procedure for NR RIM Support", R1-1808530; 3GPP TSG-RAN WG1 Meeting #94; Gothenburg, Sweden, Aug. 20-24, 2018, Aug. 24, 2018 (Aug. 24, 2018), pp. 1-5, Section 2, Sections 1-2.

Qualcomm Incorporated: "PBCH Coverage Enhancement", 3GPP TSG-RAN WG1 #72bis, R1-131397, PBCH Coverage Enhancement, 3rd Generation Partnership Project, Mobile Competence Centre; 650, Route Des Lucioles ; F-06921 Sophia-Antipolis Cedex ; France vol. RAN WG1, No. Chicago, USA, Apr. 15, 2013-Apr. 19, 2013, Apr. 6, 2013, XP050697246, 3 Pages.

Samsung: "Mechanisms for Identifying Strong gNB Interferers", 3GPP TSG RAN WG1 #94, R1-1808786, 3rd Generation Partnership Project, Mobile Competence Centre, 650, Route Des Lucioles, F-06921 Sophia-Antipolis Cedex, vol. RAN WG1, No. Gothenburg, Sweden, Aug. 20, 2018-Aug. 24, 2018, Aug. 11, 2018, XP051516159, 4 Pages.

Supplementary European Search Report—EP19862318—Search Authority—The Hague—May 18, 2022.

ZTE: "Consideration on RIM Framework and Mechanisms for Improving Network Robustness", R1-1808325, 3GPP TSG-RAN WG1 Meeting #94, 3rd Generation Partnership Project, Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018, XP051515708, pp. 1-7.

* cited by examiner

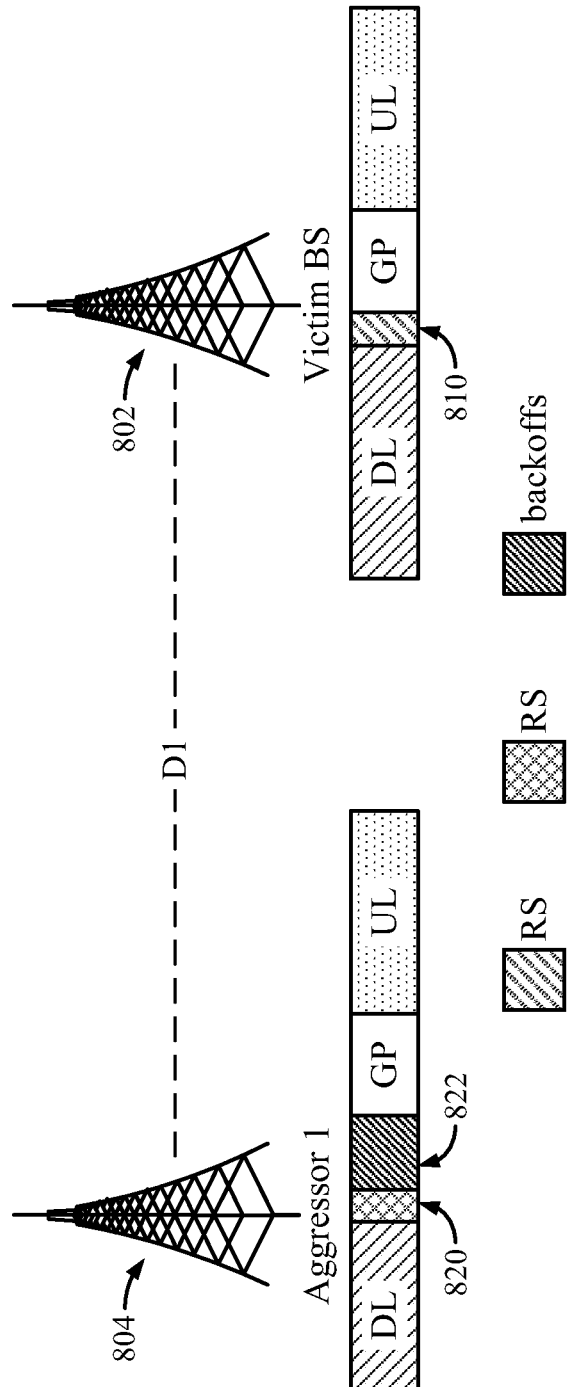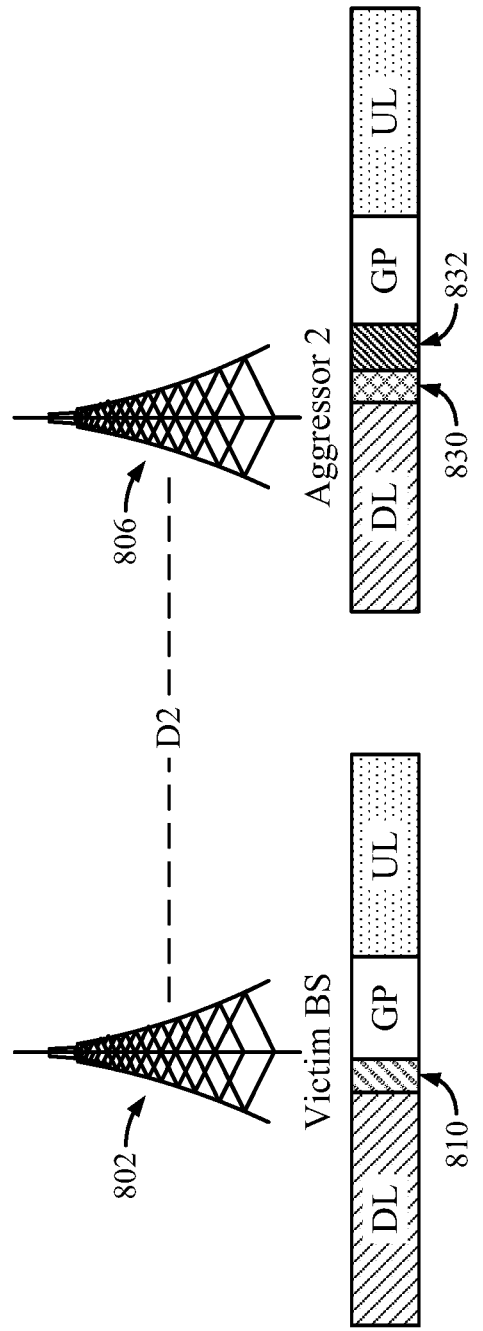
FIG. 8A
FIG. 8B

REMOTE INTERFERENCE MANAGEMENT DESIGN

CROSS-REFERENCE TO RELATED APPLICATIONS

This application is a national stage application under 35 U.S.C. 371 of PCT/CN2019/106841, filed Sep. 20, 2019, which claims priority to International Application No. PCT/CN2018/106856, filed Sep. 21, 2018, which are both assigned to the assignee of the present application and are expressly incorporated by reference herein in their entireties.

FIELD OF THE DISCLOSURE

Aspects of the present disclosure relate to wireless communications, and more particularly, to techniques for performing remote interference management.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a victim base station (BS). The method generally includes detecting interference from one or more aggressor BSs. The method also includes transmitting distinguishable victim reference signals (RSs). The method also includes monitoring for distinguishable aggressor RSs from the aggressor BSs. The method also includes determining to stop transmitting one or more of the distinguishable victim RSs based on the monitoring.

Certain aspects provide a method for wireless communication performed by an aggressor base station (BS). The method generally includes detecting a distinguishable victim reference signal (RS) from a victim BS that is experiencing or has experienced interference from one or more aggressor BSs. The method also includes transmitting a distinguishable aggressor RS to the victim BS to indicate detection of the distinguishable victim RS.

Certain aspects provide a method for wireless communication performed by a victim base station (BS). The method generally includes detecting interference associated with one or more aggressor BSs. The method also includes transmitting at least one victim reference signal (RS) in response to detecting the interference. The method also includes monitoring for an aggressor RS sent by one of the aggressor BSs in response to the at least one victim RS. The method also includes retransmitting the at least one victim RS using a coverage extension mechanism if the aggressor RS is not detected.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8a illustrates RS transmissions between a victim base station (BS) and an aggressor BS, which are at a distance D1 from each other, according to aspects of the present disclosure.

FIG. 8b illustrates RS transmissions between a victim base station (BS) and an aggressor BS, which are at a distance D2 from each other, according to aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
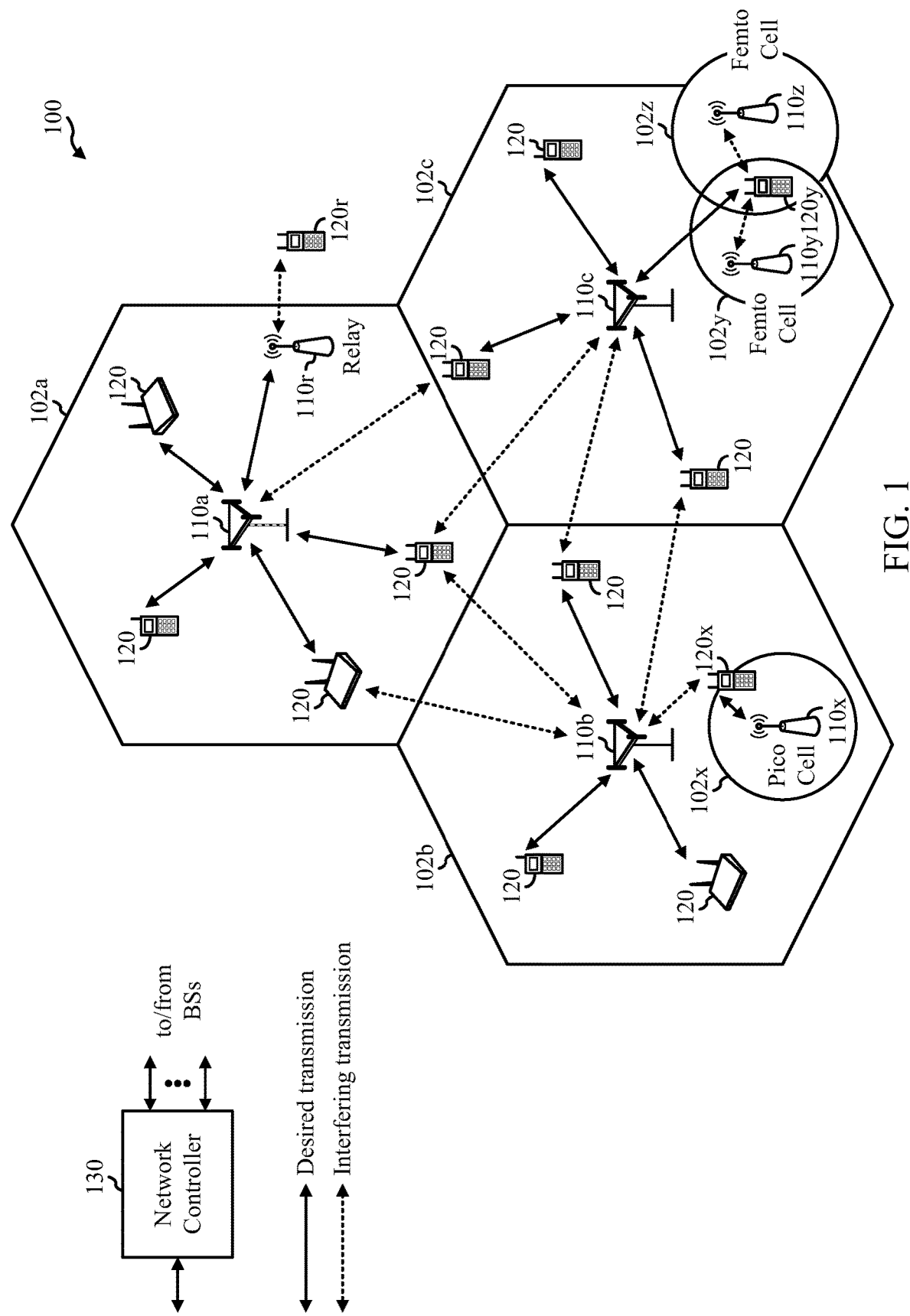
FIG. 1 is a block diagram conceptually illustrating an example telecommunications system, in accordance with certain aspects of the present disclosure.

Aspects of the present disclosure provide apparatus, methods, processing systems, and computer readable mediums for performing remote interference management.

During certain times of the year, systems using time division schemes may experience increased interference caused by atmospheric ducts. For a wireless communication system using TDD schemes, an atmospheric duct will cause long-distance downlink (DL) signals of base stations to travel through the atmosphere with a long transmission delay but with a very low attenuation, thereby, affecting the wireless communication systems performance. Since the base stations in the above mentioned systems are supposed to transmit in certain time periods and to receive uplink signals from user equipments (UEs) in other periods, it is possible that the signals from a base station travelling through an atmospheric duct will reach another base station when this other base station is supposed to receive uplink signals from the UEs. As a result, this other BS (victim BS) may experience remote interference caused by a base station (aggressor BS) that is located very far away (e.g., 100-300 kms away).

An over the air (OTA) framework has been defined to help reduce or eliminate the interference caused by aggressors BSs. Based on the framework, when a victim BS experiences remote interference, it initiates transmitting a victim reference signal (RS) to one or more aggressor BSs to notify them of the interference. In other words, detection of the victim RS by an aggressor BS indicates the victim transmitting the victim RS is experiencing remote interference. When an aggressor BS receives the victim RS, it is configured to initiate transmitting an aggressor RS to the victim RS. In response to receiving the victim RS, the aggressor BS also initiates remote interference mitigation by, for example, estimating the distance between itself and determining to mute (silence/refrain from transmitting) its downlink transmission during a number of symbols, based on the estimated distance In cases where there are multiple aggressor BSs, the victim BS may be configured in the current framework to continue to transmit the victim RS until it does not receive any aggressor RSs from any of the aggressor BSs any more or when the victim BS does not detect any interference. However, in certain cases, the current framework presents a number of different challenges. For example, in some cases, multiple aggressor BSs (both Aggressor 1 and Aggressor 2) may cause interference at the victim BS and vice versa. In such cases, the interference is symmetrical, meaning that the victim and aggressor BSs are able to receive each other's signals, causing symmetrical interference. In other words, in such cases, aggressors are also victims and victims are also aggressor because the interference is bi-directional. In multi-aggressor scenarios resulting in symmetrical interference, using the same victim RS to notify all of the different aggressor BSs of the interference results in suboptimal resource utilization at one or more of the aggressor BSs.

Accordingly, certain embodiments described herein relate to configuring a victim BS to transmit distinguishable or different victim RSs to different aggressor BSs to eliminate the resource utilization problem caused by the current remote interference management framework, as described above.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In another example, the wireless communication network 100 may be an LTE network. In wireless communication network 100, one of BSs 110 may be a victim BS (e.g., BS 110a) experiencing interference caused by a number of aggressor BSs (e.g., BS 110b and 110c). A victim BS 110 of wireless communication network 100 may perform operations 1000 of FIG. 10 as well as operations 1400 of FIG. 14. An aggressor BS 110 of wireless communication network 100 may perform operations 110o of FIG. 11.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATS. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink A finely dashed line with double arrows indicates interfering transmissions between a UE and a BS.

Figure 2:
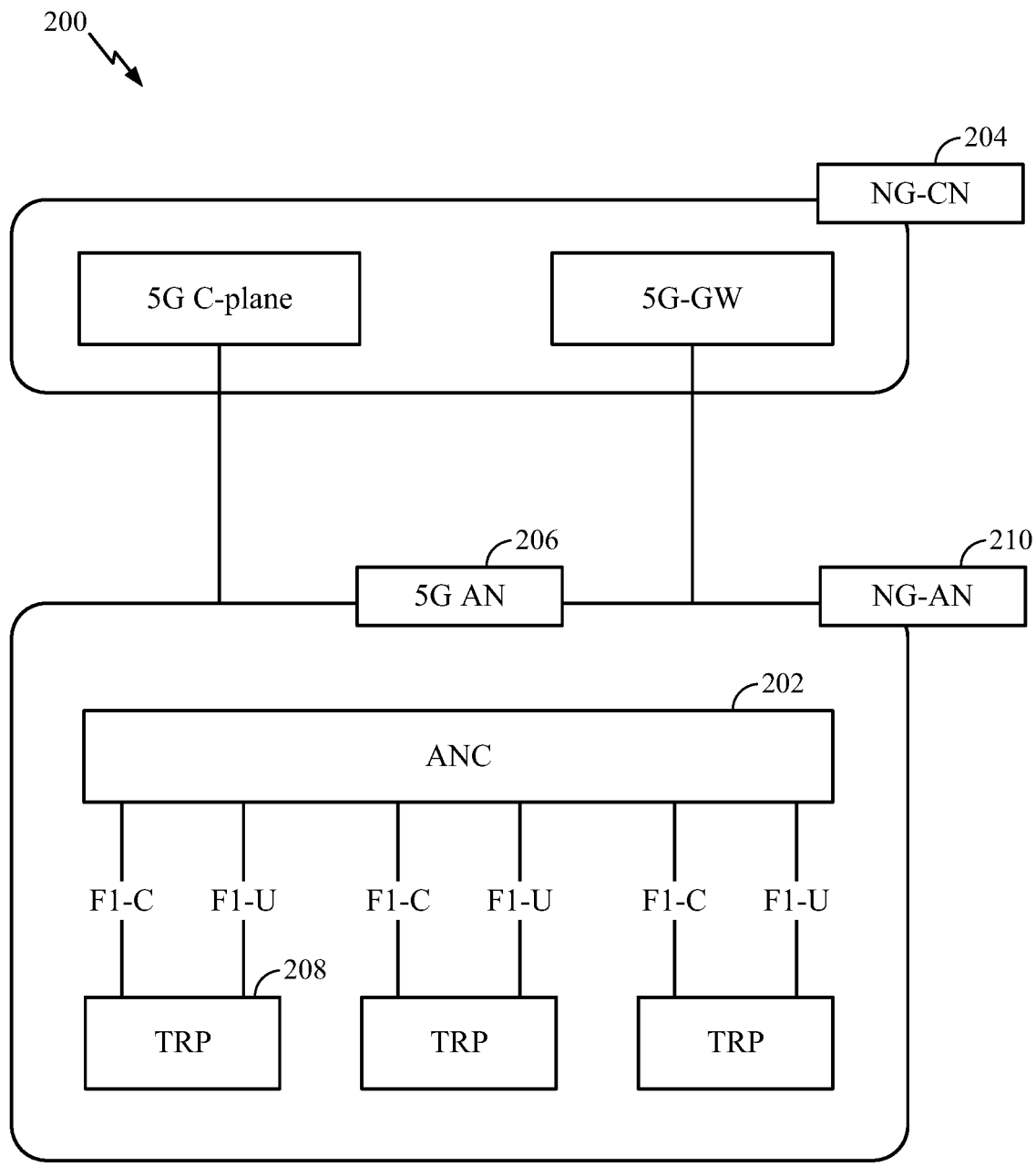
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
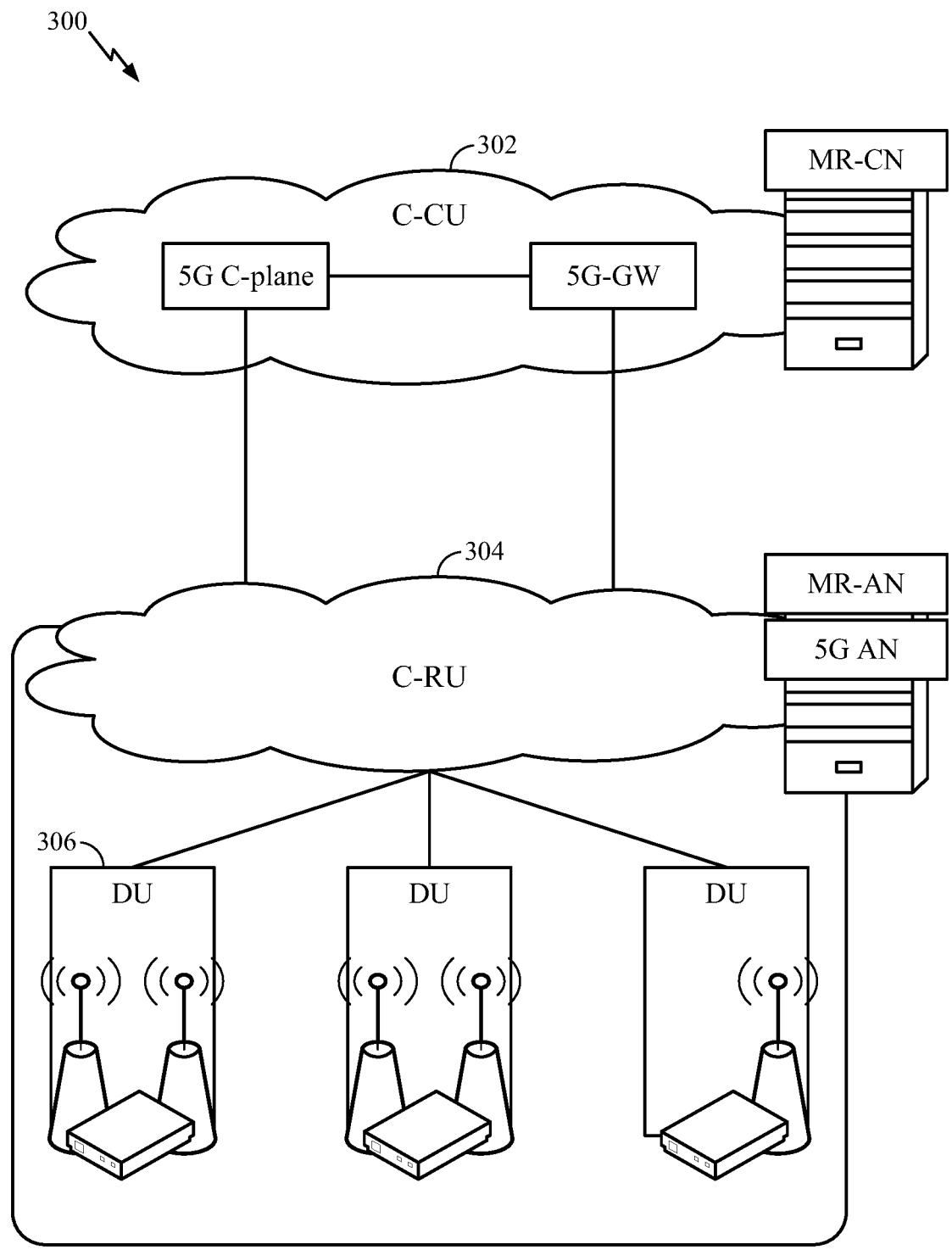
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
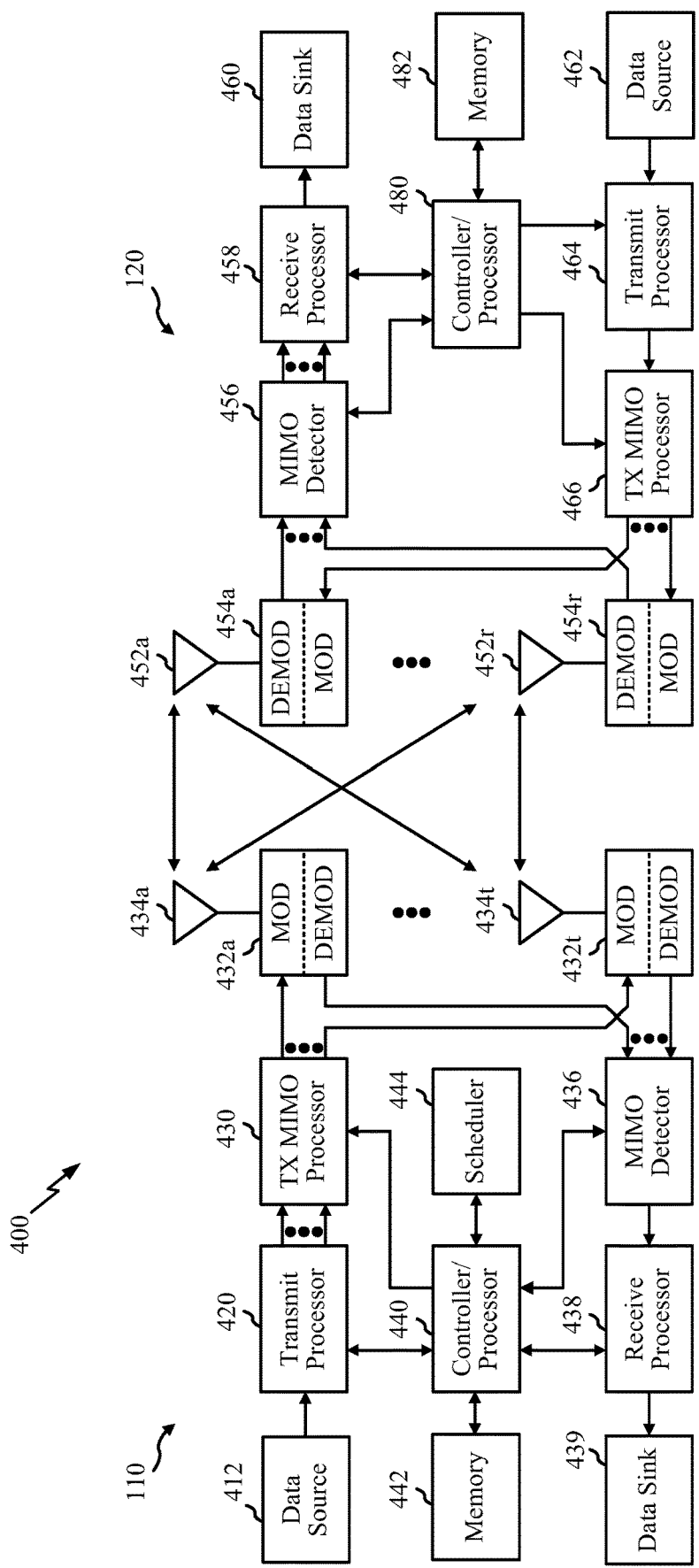
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein (e.g., operations described in FIGS. 10-11 and 14-15).

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
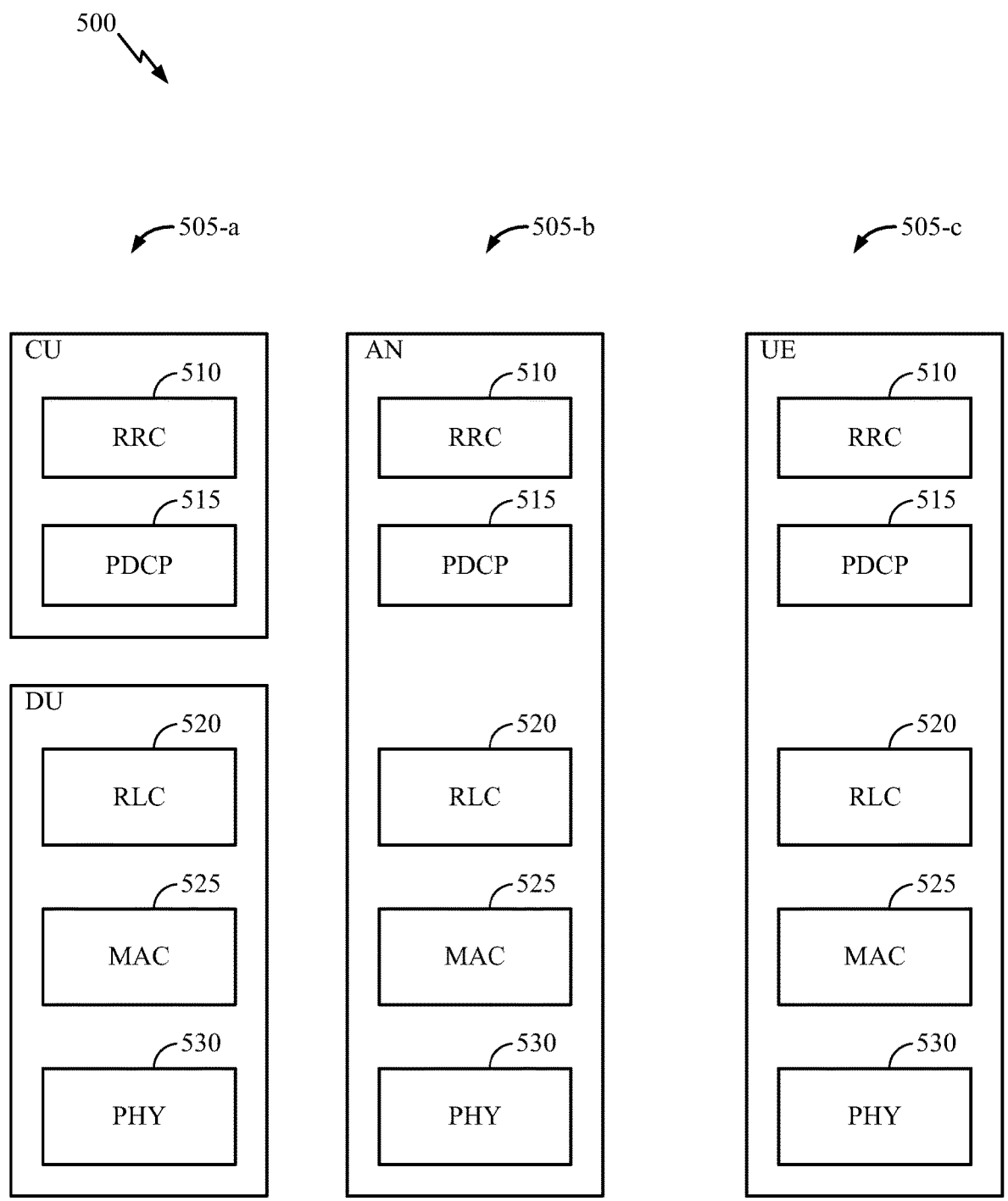
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
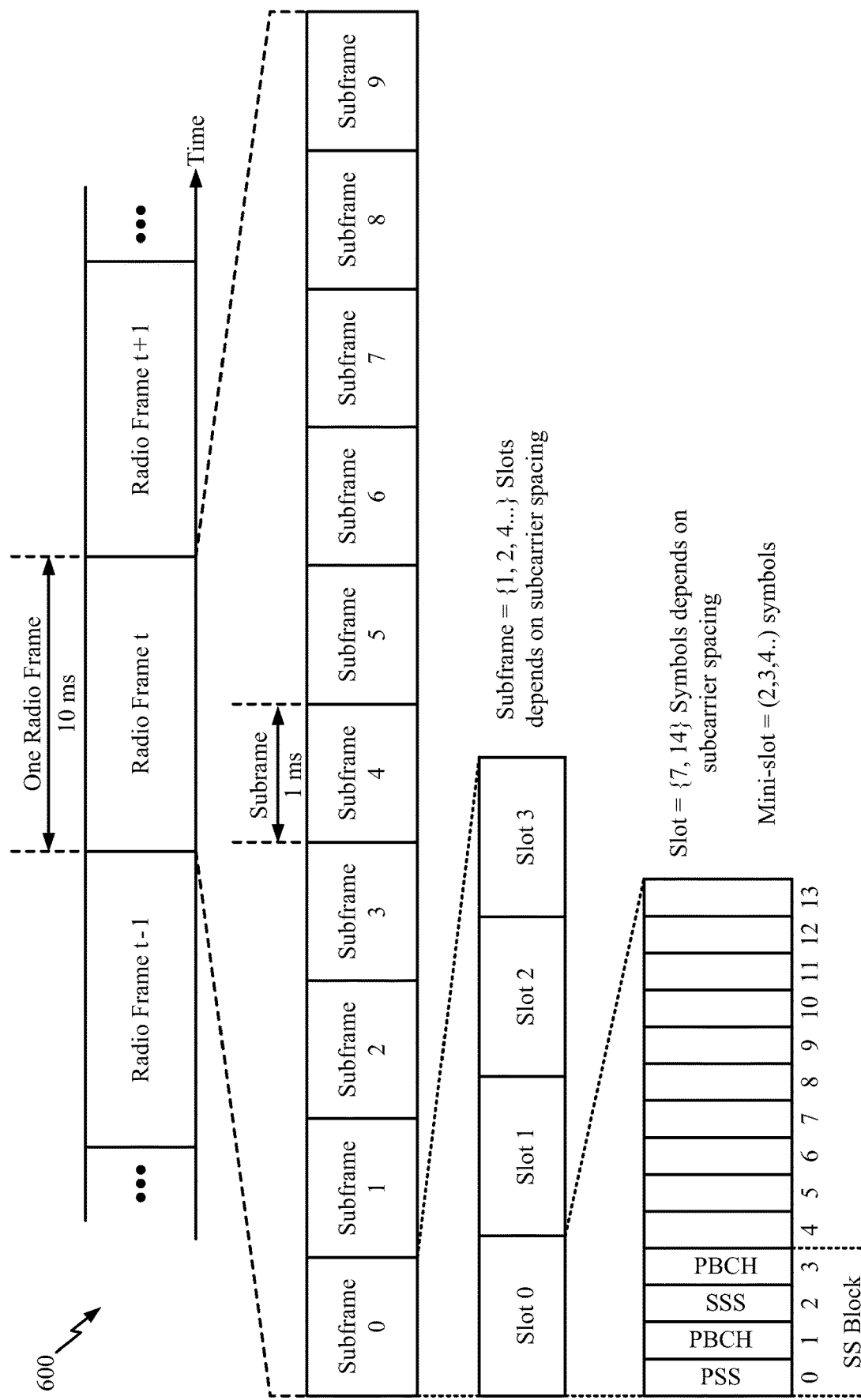
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

Example Remote Interference Management Design

During certain times of the year, systems using time division schemes may experience increased interference caused by atmospheric ducts. In telecommunications, an atmospheric duct is a horizontal layer in the lower atmosphere, in which vertical refractive index gradients are such that radio signals (and light rays) are guided or ducted along the length of the duct. The radio signals in the ducts, therefore, tend to follow the curvature of the Earth. They also experience less attenuation in the ducts than they would if the ducts were not present.

Figure 7A:
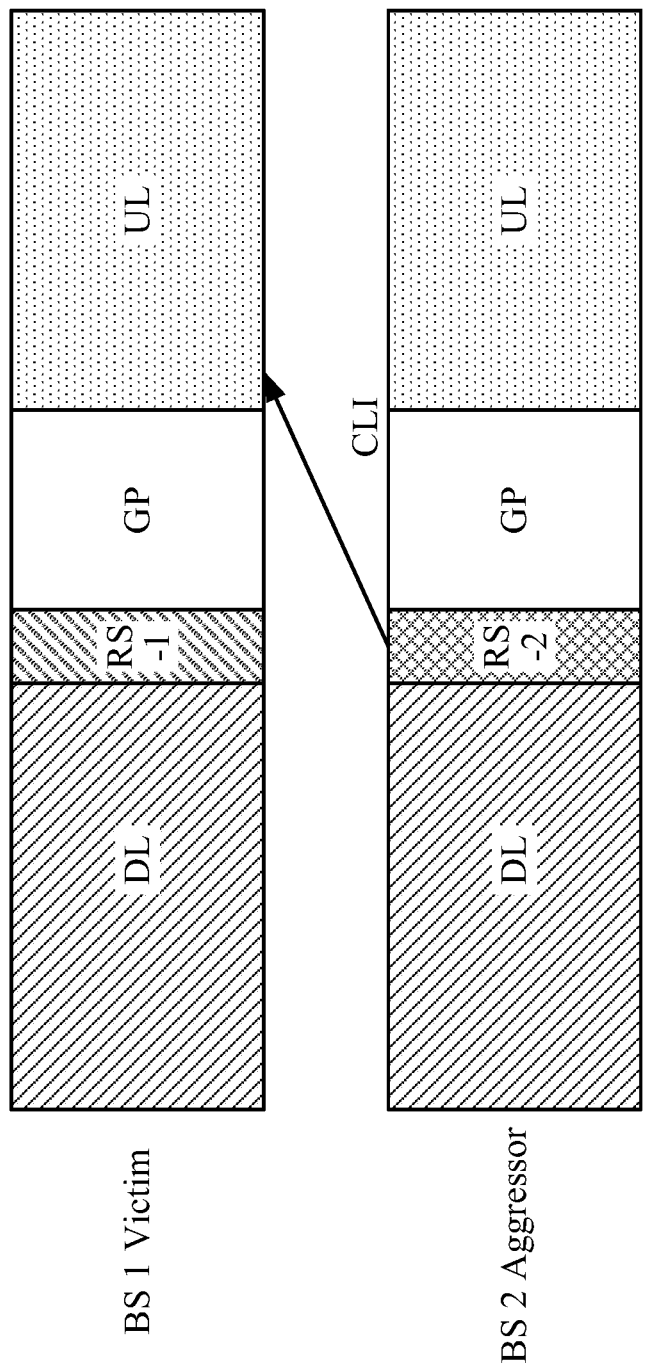
FIG. 7a illustrates an aggressor BS causing interference for a victim BS, in accordance with certain aspects of the present disclosure.

For a wireless communication system using TDD schemes, an atmospheric duct will cause long-distance downlink (DL) signals of base stations to travel through the atmosphere with a long transmission delay but with a very low attenuation, thereby, affecting the wireless communication system's performance. Since the base stations in the above mentioned systems are supposed to transmit in certain time periods and to receive uplink signals from user equipments (UEs) in other periods, it is possible that the signals from a base station travelling through an atmospheric duct will reach another base station when this other base station is supposed to receive uplink signals from the UEs. As a result, this other BS (victim BS) may experience remote interference caused by a base station (aggressor BS) that is located very far away (e.g., 100-300 kms away). For example, as shown in FIG. 7a the downlink transmission (RS-2) of the aggressor BS (BS 2 Aggressor) causes interference for the victim BS (BS 1 Victim).

An over the air (OTA) framework has been defined to help reduce or eliminate the interference caused by aggressors BSs. Based on the framework, when a victim BS experiences remote interference, it initiates transmitting a victim reference signal (RS) to one or more aggressor BSs to notify them of the interference. In other words, detection of the victim RS by an aggressor BS indicates the victim transmitting the victim RS is experiencing remote interference.

Figure 7B:
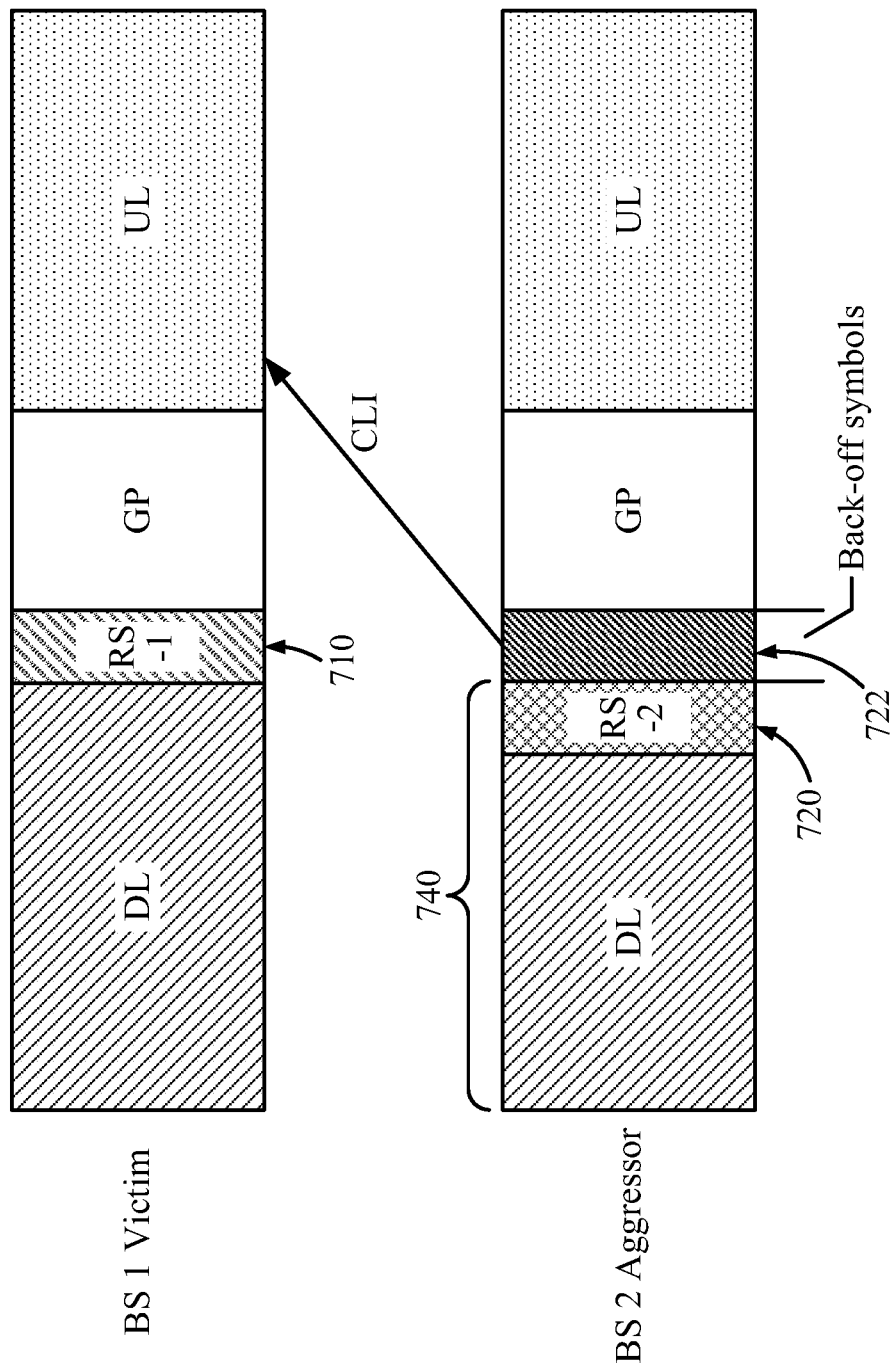
FIG. 7b illustrates example resources used for transmitting a victim reference signal (RS) and an aggressor reference signal, according to aspects of the present disclosure.

FIG. 7b illustrates resources used for transmitting victim RS 710 (shown as RS-1) by a victim BS. When an aggressor BS receives the victim RS, it is configured to initiate transmitting an aggressor RS to the victim BS. FIG. 7b also illustrates resources used for transmitting aggressor RS 720 (shown as RS-2) by an aggressor BS and resources corresponding to back-off symbols 722. An aggressor RS is transmitted to indicate to the victim BS that the victim RS has been received. In response to receiving the victim RS, the aggressor BS also initiates remote interference mitigation by, for example, estimating the distance between itself and determining to mute (silence/refrain from transmitting) its downlink transmission during a number of symbols, based on the estimated distance. The muted or nulled symbols, which may be referred to as back-off symbols (e.g., back-off symbols 722), help reduce the remote interference caused by the aggressor BS's downlink transmissions. Generally, the greater the distance between the victim BS and the aggressor BS, the larger the number of back-off symbols (due to the greater time required for the interfering signals to travel the greater distance). FIG. 7b illustrates a portion 740 of a downlink subframe (e.g., referred to as an adjusted downlink subframe) that does not include back-off symbols 722.

Based on the framework, the victim BS continues to transmit the victim RS to the aggressor BS until it does not receive any aggressor RSs any more or when the victim BS does not detect any interference. If the victim BS continues to receive aggressor RSs and also continues to detect interference, it keeps transmitting the victim RS to the aggressor BS. In response, every time, aggressor BS receives another victim RS, it mutes its transmission during a larger number of symbols.

FIG. 8a illustrates RS transmissions between a victim BS 802 (Victim BS) and a first aggressor BS 804 (Aggressor 1), which are at a distance D1 from each other. As shown, upon detecting interference, the Victim BS transmits victim RS 810. In response to detecting the victim RS 810, Aggressor 1 transmits aggressor RS 820 while also muting its transmissions during a certain number of symbols, referred to as back-off symbols. As described above, the greater the distance between the victim BS and Aggressor 1, the larger the number of back-off symbols.

In response to continuing to receive victim BS 810, Aggressor 1 continues to transmit aggressor RS 820 to Victim BS and continues to mute its downlink transmission during a larger number of symbols. At some point, Aggressor 1 determines that interference no longer exists (based on the latest victim RS 810 it has received). As such, Aggressor 1 stops transmitting aggressor RS 820 but continues to mute its downlink transmissions, during a certain number of symbols ($N_{backoff-Agg1}$), shown as back-off symbols 822.

FIG. 8b illustrates that if an aggressor BS is located at a distance that is shorter than D1, the number of back-off symbols that it would need to use to eliminate the interference it is causing for the victim BS is fewer. For example, FIG. 8b shows aggressor BS 806 (Aggressor 2) responding to the transmission of victim RS 810 by transmitting aggressor RS 830 and muting its transmission during a certain number of symbols. In response to continuing to receive victim RS 810, Aggressor 2 continues to transmit aggressor RS 830 to Victim BS and continues to mute its downlink transmission during a larger number of symbols. At some point, Aggressor 2 determines that interference no longer exists (based on the latest victim RS 810 it has received). As such, Aggressor 2 stops transmitting aggressor RS 830 but continues to mute its downlink transmissions, during a certain number of symbols ($N_{backoff-Agg2}$), shown as back-off symbols 832. As shown, because the distance between Aggressor 1 and Victim BS (shown as D1) is greater than the distance between Aggressor 2 and Victim BS, the number of back-off symbols 822 is greater than the number of back-off symbols 832 (i.e., $N_{backoff-Agg1} > N_{backoff-Agg2}$).

In certain cases, the current framework presents a number of different challenges. For example, in some cases, multiple aggressor BSs (both Aggressor 1 and Aggressor 2) may cause interference at the victim BS and vice versa. In such cases, the interference is symmetrical, meaning that the victim and aggressor BSs are able to receive each other's signals, causing symmetrical interference. In other words, in such cases, aggressors are also victims and victims are also aggressor because the interference is bi-directional. In multi-aggressor scenarios resulting in symmetrical interference, using the same victim RS to notify all of the different aggressor BSs of the interference results in suboptimal resource utilization at one or more of the aggressor BSs.

Figure 9:
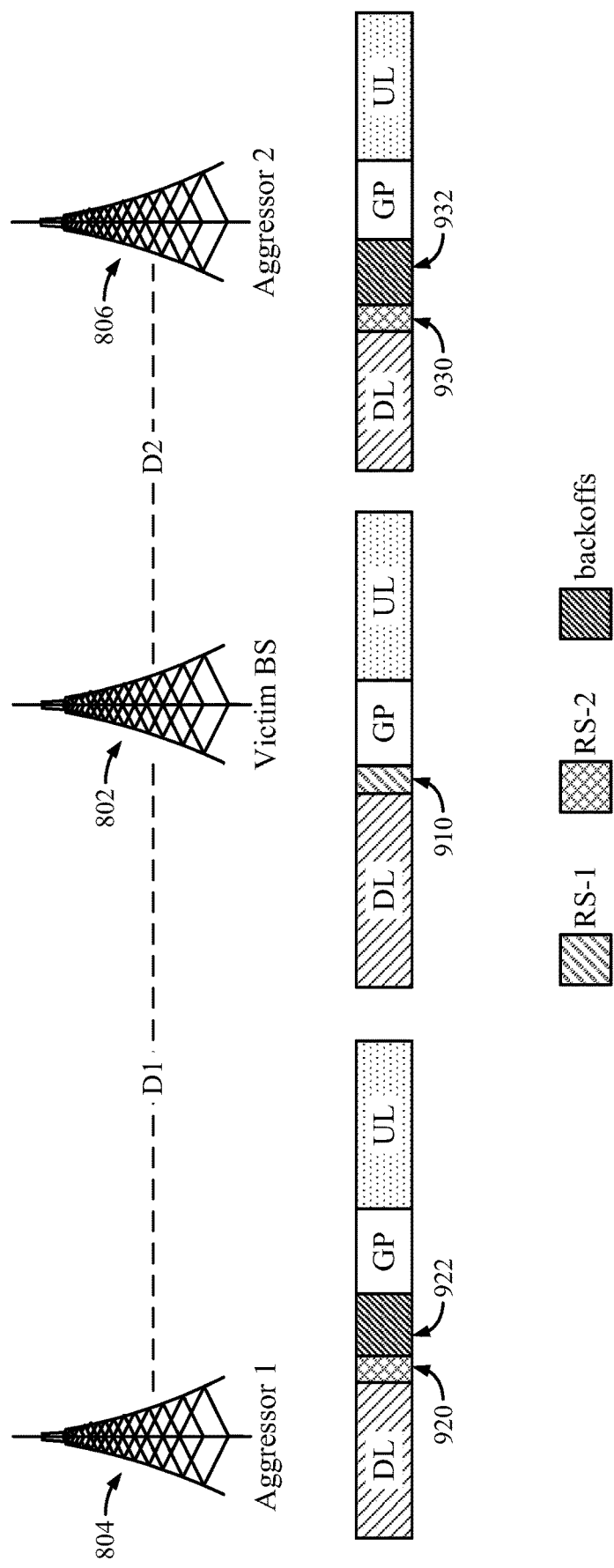
FIG. 9 shows an example of a multi-aggressor interference scenario, according to aspects of the present disclosure.

FIG. 9 shows an example of a multi-aggressor interference scenario. In FIG. 9, Victim BS is experiencing interference from downlink transmissions by Aggressor 1 and Aggressor 2. In such an example, once Aggressor 1 and Aggressor 2 receive RS 910, they may both initiate remote interference management and also start to transmit aggressor RSs to Victim BS. As described above, Victim BS may continue to transmit RS 910 until it stops detecting interference or until it stops receiving aggressor RSs from Aggressors 1 and 2.

In the example of FIG. 9, as described above, Aggressor 1 may need to mute its transmission during a larger number of symbols than Aggressor 2 because Aggressor 1 is farther away from Victim BS. For example, Aggressor 2 may need to mute its transmission during 2 symbols in order to eliminate any interference it is causing for Victim BS. On the other hand, Aggressor 1 may need to mute its transmission during 6 symbols in order to eliminate any interference it is causing for Victim BS. As such, when Aggressor 2 and Aggressor 1 both reach two back-off symbols, the interference caused by Aggressor 2 is eliminated while the interference caused by Aggressor 1 is not.

However, because Victim BS continues to experience interference, it continues to transmit victim RS 810, which is received by both Aggressor 1 and Aggressor 2. Also, because Victim BS uses a single undistinguishable RS 810, there is no way for Aggressor 2 to determine that the interference that Victim BS is detecting is not being caused by Aggressor 2. As such, when Aggressor 2 continues to receive RS 810, it assumes that it is still causing Victim BS interference and continues to mute its transmission during a larger number of symbols. This may continue until Aggressor 1 reaches 6 back-off symbols, resulting in Victim BS detecting no more interference. At this point, both Aggressors 1 and 2 are muting their transmissions during 6 back-off symbols ($N_{backoff-Agg1}=N_{backoff-Agg2}$). Unfortunately, this results in inefficient resource utilization at Aggressor 2. In other words, as described above with reference to FIG. 8*b*, Aggressor 2 is actually able to eliminate interference by muting its transmission only during only 2 symbols but, in the Example shown in FIG. 9, Aggressor 2 continues to mute since the Victim BS continues to transmit the victim RS (due to the remote interference caused by Aggressor 1). These additional four back-off symbols could be used by Aggressor 2 for transmitting information, while under the current framework they are being muted. Thus, FIG. 9 illustrates an example of this problem when the number of back-off symbols 932 is the same as the number of back-off symbols 922 when interference is eliminated by both of the aggressor BSs. However, as described above, given that Aggressor 2 is at a shorter distance than Aggressor 1, it should not be muting its transmission during as many symbols to eliminate its interference.

Accordingly, certain embodiments described herein relate to configuring a victim BS to transmit distinguishable or different victim RSs to different aggressor BSs to eliminate the resource utilization problem caused by the current remote interference management framework, as described above.

Figure 10:
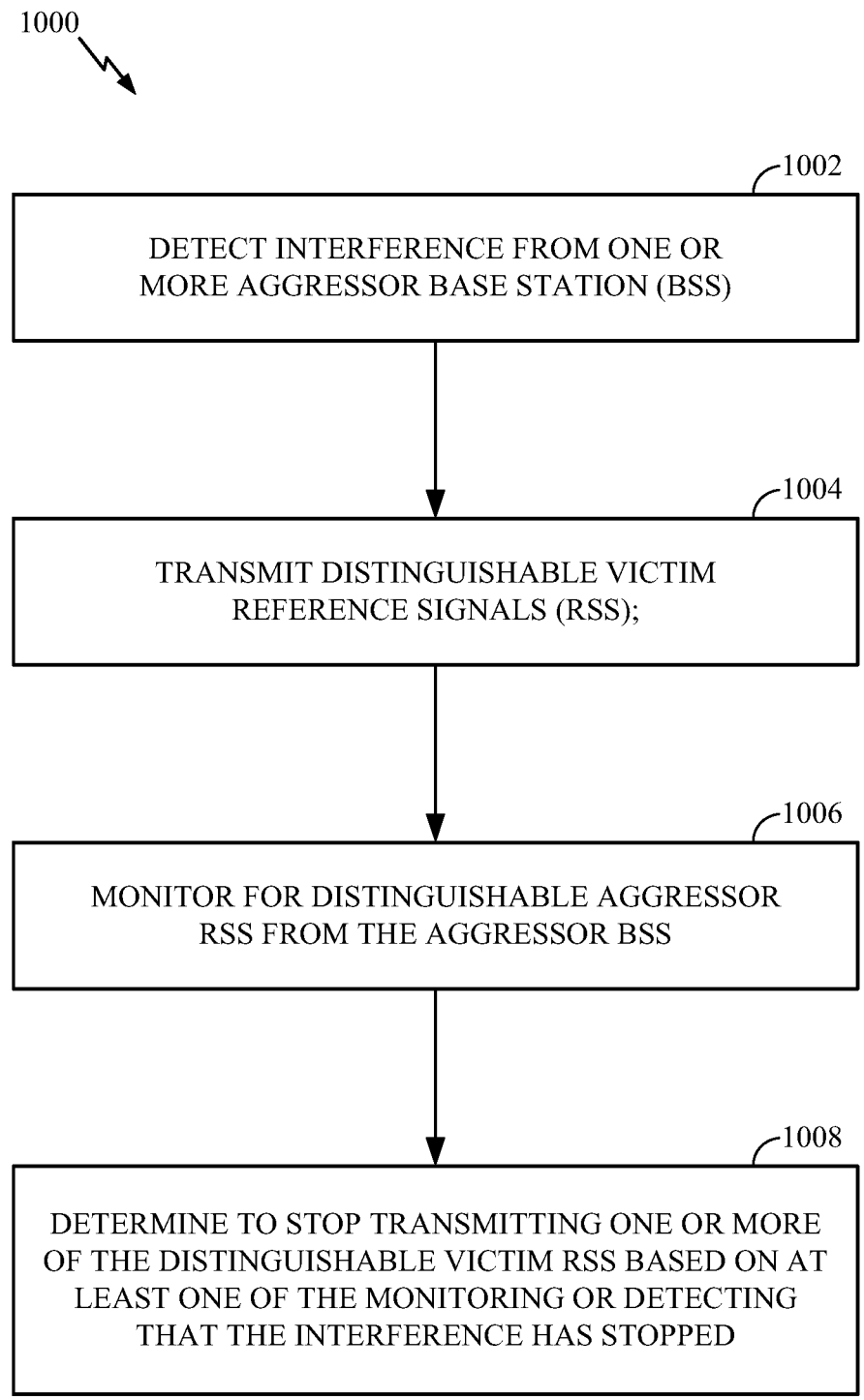
FIG. 10 illustrates example operations performed by a victim BS, according to aspects of the present disclosure.

FIG. 10 illustrates example operations 1000 performed by a victim BS, according to aspects of the present disclosure. For example, operations 1000 could be performed by a victim BS, such as Victim BS (victim BS 802) of FIGS. 8 & 9.

Operations 1000 begin, at 1002, by detecting interference from one or more aggressor BSs. At 1004, operations 1000 continue by transmitting distinguishable victim reference signals (RSs). At 1006, operations 1000 continue by monitoring for distinguishable aggressor RSs from the aggressor BSs. At 1008, operations 1000 continue by determining to stop transmitting one or more of the distinguishable victim RSs based on the monitoring.

Figure 11:
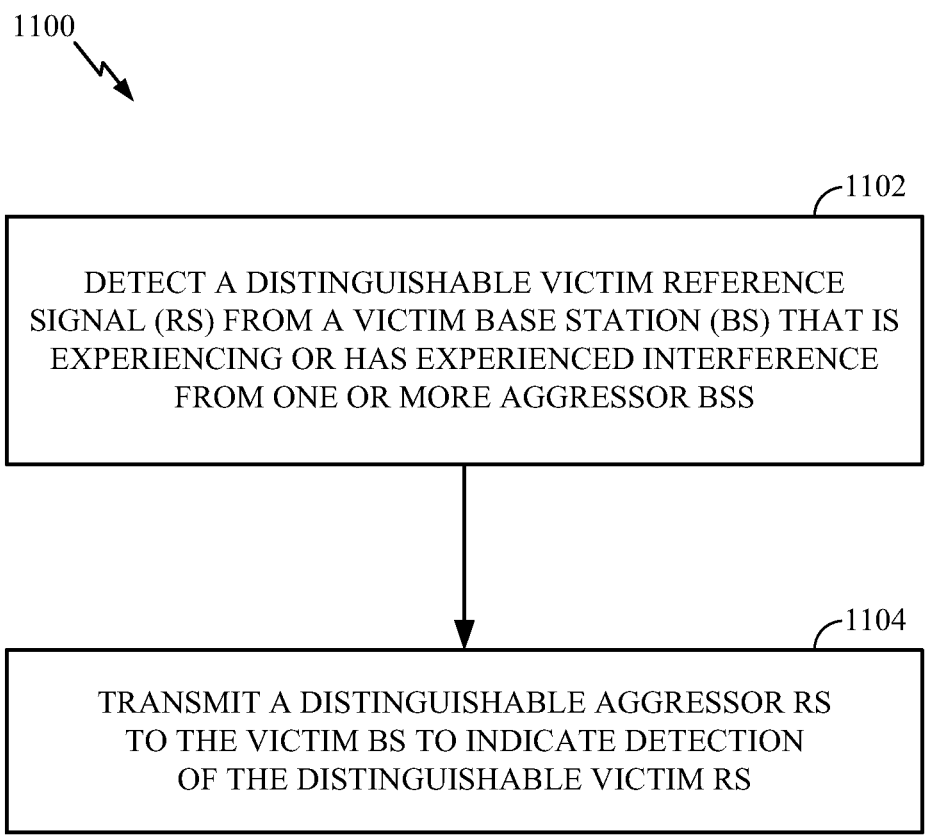
FIG. 11 illustrates example operations performed by an aggressor BS, according to aspects of the present disclosure.

FIG. 11 illustrates example operations 1100 performed by an aggressor BS, according to aspects of the present disclosure. For example, operations 1000 could be performed by an aggressor BS, such as Aggressor 1 and Aggressor 2 of FIGS. 8 & 9, to manage remote interference that impacts a victim BS performing operations 1000 of FIG. 10.

Operations 1100 begin, at 1102, by detecting a distinguishable victim reference signal (RS) from a victim BS that is experiencing or has experienced interference from one or more aggressor BSs. At 1104, operations 1100 continue by transmitting a distinguishable aggressor RS to the victim BS to indicate detection of the distinguishable victim RS.

As described above, in order to address the resource utilization problem caused by the current framework, in certain aspects, a victim BS may be configured to transmit distinguishable RSs to different aggressor BSs. For example, upon detecting interference, Victim BS 802 of FIG. 8 may initiate transmitting two distinguishable victim RSs (RS1-1, shown as 1210*a*, and RS1-2, shown as 1210*b*). Note that the number of distinguishable victim RSs used here is merely for exemplary reasons and that any number of distinguishable victim RSs may be used (e.g., based on the interference level). In the example above, victim RS1-1 is distinguishable from victim RS1-2 by aggressor BSs. This is because, as described further below, each distinguishable victim RS comprises information (e.g., aggressor sequence(s), etc.) that is different from information included in other distinguishable victim RSs. In certain aspects, a victim BS may be configured to transmit only a certain number (K) of distinguishable victim RSs to the multiple aggressor BSs. For example, the victim BS may be configured to transmit RS1-1 through RS1-K to various different aggressor BSs. Each BS in a network, such as network 100 of FIG. 1, may be configured to monitor for certain information (e.g., aggressor sequence) in a victim RS. For example, Aggressor 2 may be configured to monitor for RS1-1 while Aggressor 1 may be configured to monitor for RS1-2.

As a result, when Aggressor 2, receives RS1-1, it determines that Victim BS is attempting to notify Aggressor 2 about interference that Aggressor 2 is causing for Victim BS. In response, Aggressor 2 initiates transmitting a distinguishable aggressor RS, such as RS2-1 (shown as RS 1230) back to Victim BS while also performing remote interference management. Similarly, when Aggressor 1, receives RS1-2 (shown as RS 1220), it determines that Victim BS is attempting to notify Aggressor 1 about interference that Aggressor 1 is causing for Victim BS. In response, Aggressor 1 initiates transmitting a distinguishable aggressor RS, such as RS2-2 back to Victim BS while also performing remote interference management. As described above, Victim BS continues to transmit RS1-1 until it stops receiving RS2-1 from Aggressor 2 or until it does not detect any interference. Similarly, Victim BS continues to transmit RS1-2 until it stops receiving RS2-2 from Aggressor 1 or until it does not detect any interference.

When Victim BS stops receiving a distinguishable aggressor RS (e.g., RS2-1 or RS2-2), it stops transmitting the corresponding victim RS (e.g., RS1-1 or RS1-2) to the corresponding aggressor BS.

Figure 12:
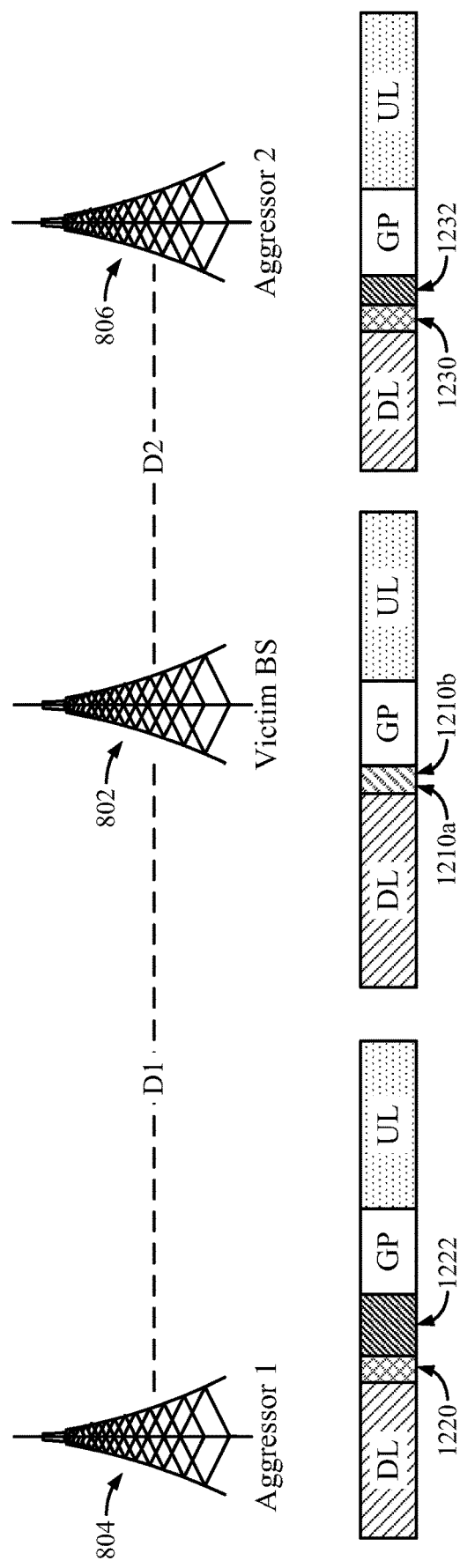
FIG. 12 shows an example of a multi-aggressor interference scenario where the victim BS transmits distinguishable victim RSs, according to aspects of the present disclosure.

For example, as shown in FIG. 12, when Aggressor 2 reaches 2 back-off symbols 1232, it stops transmitting RS2-1 to Victim BS. When Victim BS stops receiving RS2-1 from Aggressor 2, Victim BS also stops transmitting RS1-1. In response, when Aggressor 2 stops receiving RS1-1, in certain aspects, it continues to mute its transmission during back-off symbols 1232. This is while Victim BS may still experience interference by, for example, Aggressor 1. But because Victim BS has used distinguishable victim RSs, Victim BS is able to notify Aggressor 2 that 2 back-off symbols are enough for eliminating the interference caused by Aggressor 2. On the other hand, Victim BS continues to transmit RS1-2 to Aggressor 1 because Aggressor 1 is still causing interference for Victim BS and has not stopped transmitting its distinguishable RS2-2.

Therefore, in the example of FIG. 12, when interference is eliminated by Aggressor 1, Aggressor 1 has reached 6 back-off symbols 1222 while Aggressor 2 is still at the same 2 back-off symbols 1232. Implementing the aspects described herein, therefore, enables Aggressor 2 to more efficiently utilize its resources. Because, unlike in FIG. 9 where Aggressor 2 continues to mute its transmission during a larger number of symbols (e.g., eventually reaching 6 symbols), in the example of FIG. 12, Aggressor 2 is able to limit the number of back-off symbols to 2.

Note that if, in certain aspects, at any point during the procedure described above, Victim BS stops detecting interference overall, Victim BS stops the transmission of all the distinguishable victim RSs.

Although in FIG. 9, Aggressor 2 and Aggressor 1 are each shown as one BS, in certain aspects, Aggressor 2 may be representative of a group of aggressor BSs (e.g., all configured to monitor for RS1-1) and Aggressor 1 may be representative of a group of aggressor BSs (e.g., all configured to monitor for RS1-2). In certain aspects, Victim BS may also be representative of a group of victims BSs. For example, a group of aggressor BSs that are a certain distance away from a victim BS (e.g., in a certain geographic region) may be grouped due to the likelihood of their remote interference having a similar impact on a victim.

In certain aspects, a victim BS (e.g., victim BS 802) may transmit a distinguishable victim RS (e.g., RS1-1, RS1-2, etc.) using the last one or more symbols (e.g., last one, last two, last three, last four, etc.) of downlink subframes. In addition, in certain aspects, an aggressor BS (e.g., BS 804, BS 806) may transmit a distinguishable aggressor RS (e.g., RS2-1, RS2-2, etc.) using the last one or more symbols (e.g., last one, last two, last three, last four, etc.) of adjusted downlink subframes. An adjusted downlink subframe refers to the portion (e.g., symbols) of a downlink subframe that is not used for or does not include back-off symbols. An example of this is shown in FIG. 7 as portion 740. In that example, the aggressor BS uses the last one or more symbols (e.g., last one, last two, last three, last four, etc.) of portion 740 to transmit the distinguishable aggressor RS.

As described above, each distinguishable victim RS comprises information that makes the victim RS different from other victim RSs. Similarly, each distinguishable aggressor RS comprises information that makes the victim RS different from other victim RSs.

Figure 13A:
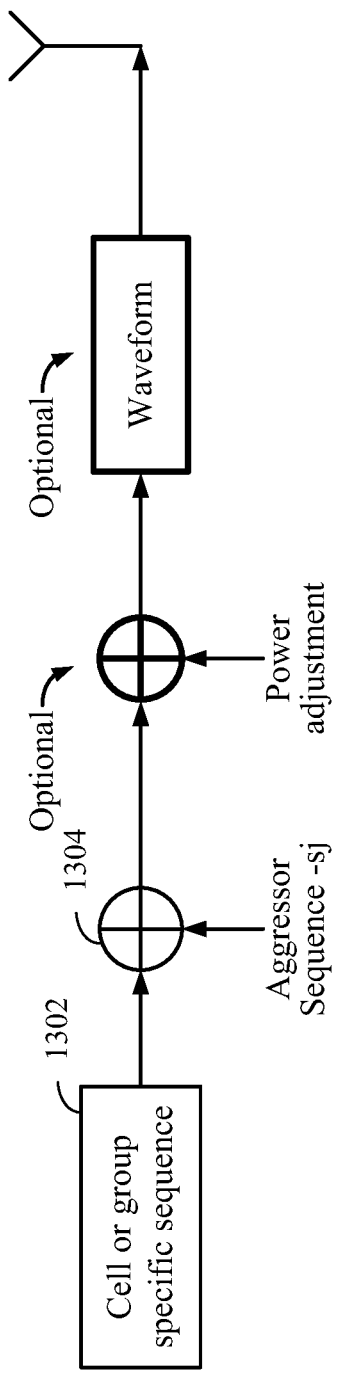
FIG. 13A illustrates a flow process of how an example victim RS may be generated using a distinguishable aggressor sequence, according to aspects of the present disclosure.

For example, a distinguishable victim RS may include a cell/group specific sequence as well as an aggressor sequence. A cell/group specific sequence helps an aggressor BS identify the cell/group that the victim RS belongs to. For example, a cell specific sequence may be the cell ID of the cell in which the victim BS is located. A group specific sequence may be a group ID associated with a group of BSs that the victim BS may belong to. An aggressor sequence may include a unique sequence that one or a group of aggressor BSs may be configured to monitor for. In certain aspects, each victim RS (RS1-1 through RS1-K) comprises a different aggressor sequence (Sj; j=1 through K), resulting in each victim RS being distinguishable. FIG. 13A illustrates a flow process of how an example victim RS may be generated. As shown, when generating a victim RS, a victim BS may combine a cell/group specific sequence 1302 with an aggressor sequence Sj 1304. In certain aspects, as further described below, the victim BS may also optionally adjust (e.g., increase) the transmission power of the victim RS transmission.

Once a victim BS transmits a distinguishable victim RS, with a unique aggressor sequence, to an aggressor BS, the aggressor BS then uses the unique aggressor sequence received in the victim RS to generate an aggressor RS. For example, the aggressor BS may be configured with a sequence scrambling algorithm to scramble the aggressor sequence received in the victim RS. The aggressor BS may then generate a distinguishable aggressor RS using the scrambled aggressor sequence (e.g., scrambled form of the aggressor sequence). Once the victim BS receives the distinguishable aggressor RS with the scrambled aggressor sequence, it is able to descramble the scrambled aggressor sequence and identify which distinguishable victim RS the aggressor sequence corresponds to.

In certain other aspects, the aggressor BS may generate a distinguishable RS by creating a paired sequence that includes the aggressor sequence received from the victim RS with different shiftings.

Figure 13B:
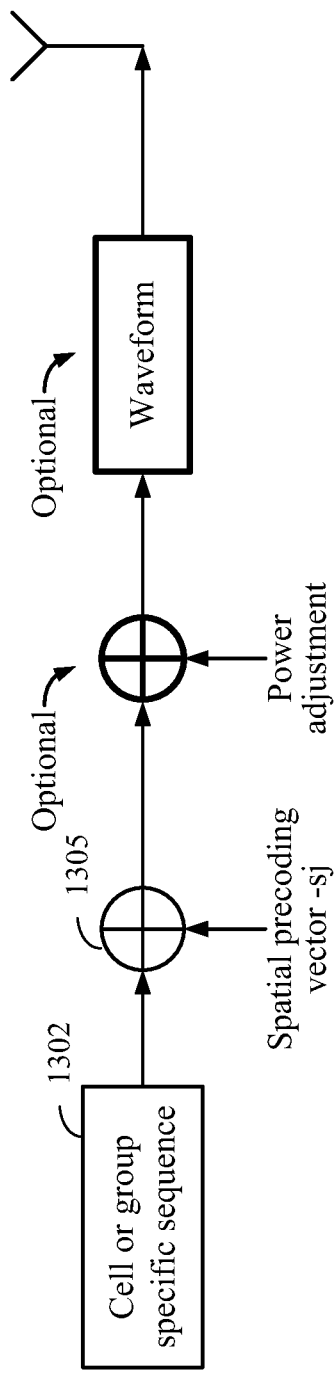
FIG. 13B illustrates a flow process of how an example victim RS may be generated using a distinguishable spatial precoding/beamforming vector, according to aspects of the present disclosure.

In another example, a victim BS may utilize a unique spatial precoding/beamforming vector to transmit a victim RS. In certain aspects, the victim RS may include a cell/group specific sequence, which may be the same across the various victims RSs (e.g., RS1-1 through RS1-k). However, what makes each victim RS distinguishable is the unique spatial precoding/beamforming vector that is used when transmitting the victim RS to a group of one or more aggressor BSs. In such embodiments, the aggressor BSs in such a group may be configured to monitor for such a spatial precoding/beamforming vector. As such, if an aggressor BS outside of that group receives the distinguishable victim RS, it is configured to ignore the RS because the aggressor BS is not configured to monitor for RSs with such a spatial precoding/beamforming vector (e.g., the aggressor BS may be configured to monitor for RSs with a different spatial precoding vector). FIG. 13B illustrates an example of a victim BS generating a victim RS using a cell/group specific sequence 1302 as well as a unique spatial precoding vector 1305.

Once an aggressor BS receives a distinguishable victim RS that is configured to monitor, it then generates an aggressor RS that comprises a scrambled form of the spatial precoding/beamforming vector that the victim RS was transmitted with.

Example Coverage Extension Method for Asymmetric Interference Situations

As discussed in certain cases, aggressor BSs are able to receive the victim BS's signaling, thereby causing symmetrical interference. In such cases, therefore, the aggressor BSs are able to receive the victim BS's victim RS. However, in some cases, some of the aggressor BSs may not be able to receive the victim RS. In such cases, the interference may be a converged signal from multiple aggressor BSs, creating an asymmetric interference situation. In certain aspects, although such aggressors BSs are not able to receive OTA transmissions, the victim BS may be able to trigger the aggressor BSs to perform remote interference management as well as transmit aggressor RSs to the victim BS through backhaul signaling. However, in some cases, the victim BS may not be able to fully rely on the backhaul signaling, especially if certain infrastructure systems are not able to communicate among each other.

Accordingly, certain aspects described herein related to a victim BS performing coverage extension when retransmitting a victim RS over the air upon receiving no corresponding aggressor RS in response to having transmitted the victim RS already.

Figure 14:
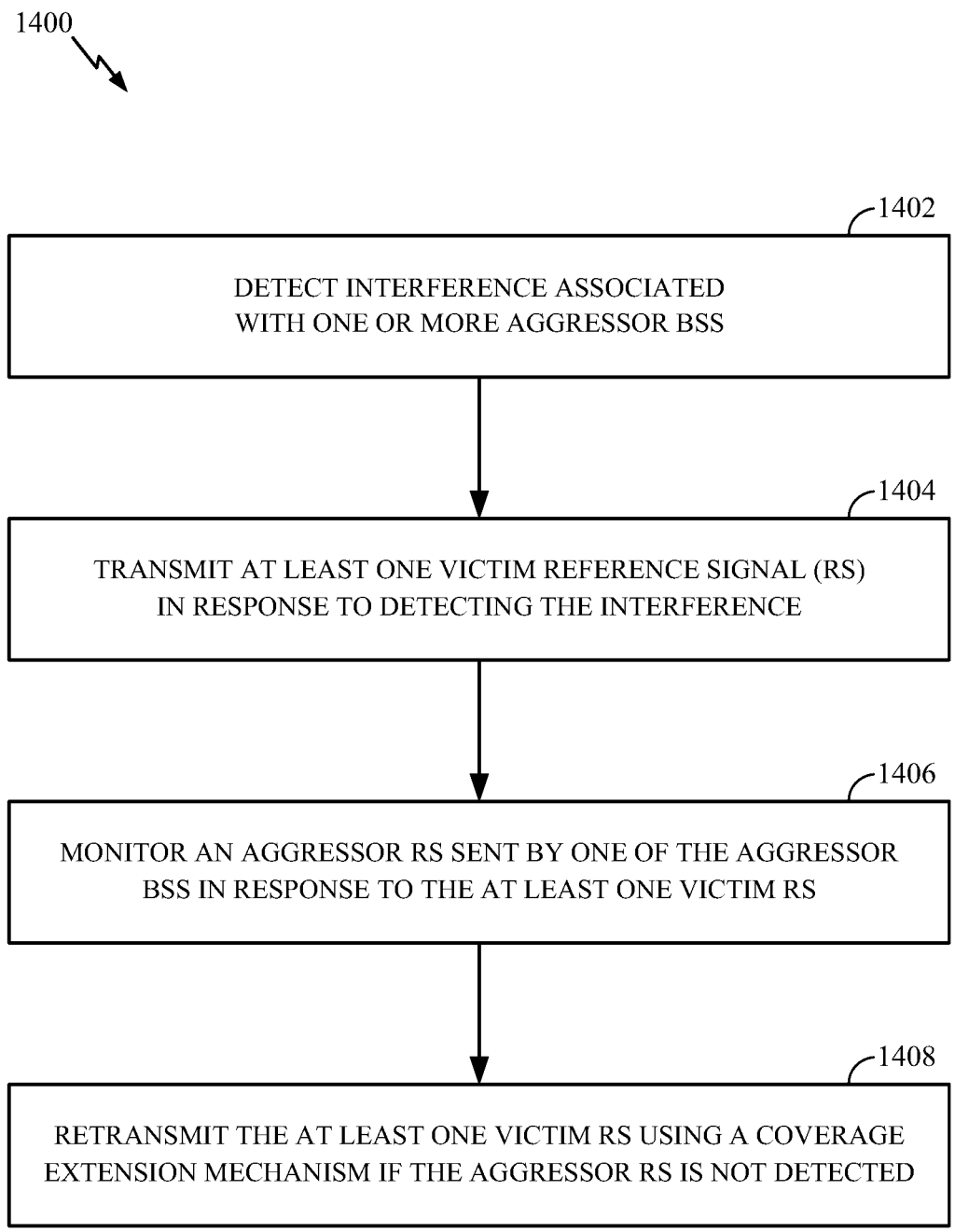
FIG. 14 illustrates example operations performed by a victim BS, according to aspects of the present disclosure.

FIG. 14 illustrates example operations 1400 performed by a victim BS (e.g., BS 110), according to aspects of the present disclosure. Operations 1400 begin, at 1402, by detecting interference associated with one or more aggressor BSs. At 1404, operations 1400 continue by transmitting at least one victim reference signal (RS) in response to detecting the interference. At 1406, operations 1400 by monitoring for an aggressor RS sent by one of the aggressor BSs in response to the at least one victim RS. At 1408, operations 1400 continue by retransmitting the at least one victim RS using a coverage extension mechanism if the aggressor RS is not detected.

As described above, in certain cases, some of the aggressor BSs may not receive the corresponding victim RS. To illustrate this with an example, Victim BS of FIG. 9 may detect interference and initiate transmitting distinguishable victim RSs (RS1-1 and RS1-2). In such an example, Victim BS may not receive any aggressor RSs (e.g., RS2-1 and RS2-2) from Aggressor 2 and Aggressor 1 and continue to detect interference. This may indicate to Victim BS that Aggressor 1 and Aggressor 2 must have not received RS1-2 and RS1-1. As a result of this, Victim BS may apply coverage extension when retransmitting RS1-1 and RS1-2.

In certain aspects, Victim BS may use one or more coverage extension methods for the retransmissions of the distinguishable victim RSs.

In certain aspects, Victim BS may apply a transmission power boosting method. For example, Victim BS may have transmitted RS1-1 and RS1-2 the first time using a transmission power of X. When performing a transmission power boosting method, Victim BS may then increase the transmission power by a pre-configured amount or increment/step. For example, Victim BS may increase the power by Y so that when RS1-1 and RS1-2 are retransmitted, a transmission power of X+Y is used. In one example, if Victim BS continues to detect interference even after retransmitting RS1-1 and RS1-2 with transmission power X+Y, Victim BS may be configured to continue increasing the transmission power for subsequence retransmissions until it receives RS2-1 and RS2-2. In the example above, Victim BS may increase the transmission power to X+2Y for the next transmission.

In certain aspects, Victim BS may increase the transmission power based on the residual interference level. In other words, Victim BS determines an amount to increase the transmission power based on how much interference it is experiencing. In certain aspects, the higher the amount of residual interference, the higher the transmission power (i.e., Victim BS is configured to increase the transmission power by a larger amount). As an example, after transmitting RS1-1 and RS1-2, Victim BS and receiving no aggressors RSs in response, Victim BS may then determine the residual interference level to calculate an increment by which to increase the transmission power. For instance, if the residual interference level is low, Victim BS may increase the transmission power by one increment/step (e.g., X+Y) but if the residual interference level is higher, Victim BS may increase the transmission power by two increments/steps (e.g., X+2Y)

In certain aspects, a Victim BS may be among a group of victim BSs that are experiencing the same interference from Aggressor 1 and Aggressor 2. In such aspects, to boost the transmission power, Victim BS may request the other victim BSs to also transmit the victim RSs at the same time. This leads into a higher overall transmission power and, therefore, increases the likelihood of aggressors BSs receiving the victim RSs.

In certain aspects, instead of or in addition to the transmission power boosting method, Victim BS may utilize a signaling repetition method (also referred to as a time domain repetition method). For example, victim BS may allocate a larger number of symbols and/or physical resource blocks (PRBs) to transmitting the victim RS. In such an example, Victim BS may initiate transmissions of victim RSs while in a normal coverage mode (e.g., default state) but then enter an extended coverage mode upon receiving no corresponding aggressor RSs. In the extended coverage mode, Victim BS may start allocating more time and/or frequency resources when retransmitting the victim RSs. For example, Vitim BS may transmit the victim RS two times in two consecutive symbols. For example, Victim BS may transmit RS1-1 in symbol X and then retransmit RS1-1 in symbol X+1. In another example, VM BS may transmit the victim RS in different slots. In yet another example, VM BS may transmit the victim RS in the same slot but different and non-consecutive symbols.

The example above relates to a scenario where none of the aggressor BSs is able to receive their corresponding victim RSs. However, in certain cases, some aggressor BSs are able to receive their corresponding victim BSs from the victim BS while some are not. For example, Victim BS may start transmitting RS1-1 and RS1-2. Subsequently, Victim BS may start receiving RS2-1 from Aggressor 2 but not RS2-2 from Aggressor 1. In certain aspects, this indicates to Victim BS that Aggressor 1 must have not received RS1-2. In such aspects, Victim BS may apply coverage extension methods (e.g., the methods described above) to the retransmission of RS1-2 to Aggressor 1. In other words, in certain aspects, Victim BS is able to determine which victim RS (e.g., RS1-2) is not resulting in any response, based on which Victim BS may apply coverage extension only to the retransmission of those victim RSs. This helps Victim BS with resource efficiency because Victim BS does not need to apply coverage extension to the retransmission of victim RSs that seem to have been received by the corresponding aggressor BSs.

In certain aspects, a victim BS may apply coverage extension but without implementing the techniques described above relating to transmitting distinguishable victim RSs to different aggressor BSs. To illustrate this with an example, Victim BS of FIG. 9 may transmit a single victim RS to all different aggressor BSs, including Aggressor 1 and Aggressor 2. In such an example, Victim BS may determine that one or more of the multiple aggressor BSs have not received the victim RS. In one example, Victim BS is able to determine that one or more of the multiple aggressor BSs have not received the victim RS because after the transmission of the victim RS, Victim BS does not receive any aggressor RS and still continues to detect interference. In such an example, none of the aggressors BSs might have received the victim RS, in which case victim BS applies coverage extension (e.g., the methods described above) when retransmitting the victim RS. In another example, after transmitting the victim RS, Victim BS may receive some aggressor RSs but still continue to detect interference, in which case, Victim BS may apply coverage extension to the retransmissions of the victim RS.

Figure 15:
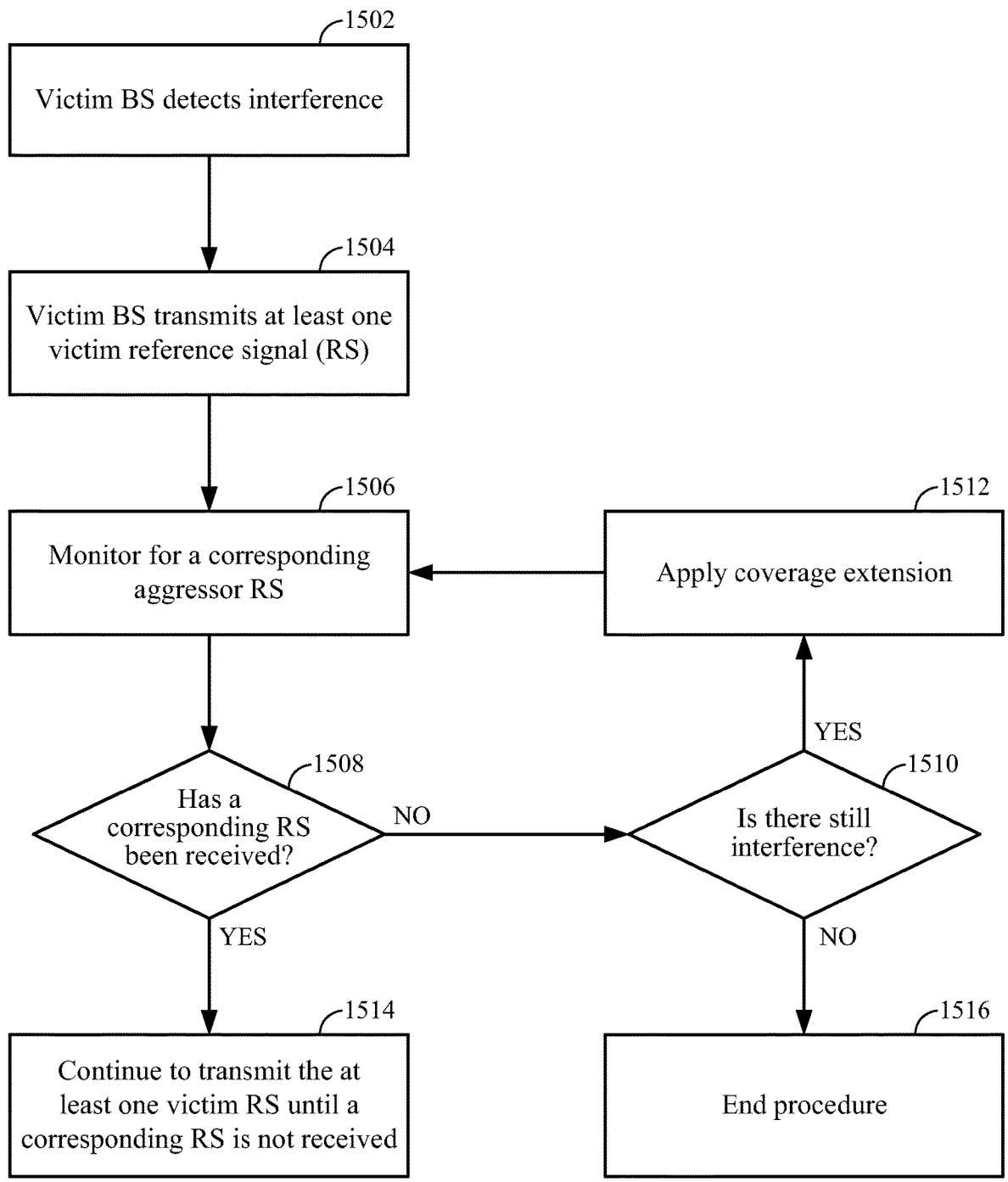
FIG. 15 illustrates an example flow diagram for applying a coverage extension mechanism to transmitting a victim RS, according to aspects of the present disclosure.

FIG. 15 illustrates an example flow diagram for a victim BS to apply coverage extension. At 1502, the victim BS detects interference. At 1504, victim BS transmits at least one victim RS. At 1506, the victim BS monitors for a corresponding aggressor RS. At 1508, the victim BS determines if a corresponding aggressor RS has been received. If not, at 1510, the victim BS determines if it can still detect interference. If yes, at 1512, the victim BS applies coverage extension (e.g., one or more of the methods described above) and re-performs block 1506 to retransmit the victim RS (at 1506). If at 1508, the victim BS determines that it has received a corresponding aggressor RS, the victim BS continues to transmit the victim RS until it stops receiving the corresponding aggressor RS or until interference no longer exists.

Figure 16:
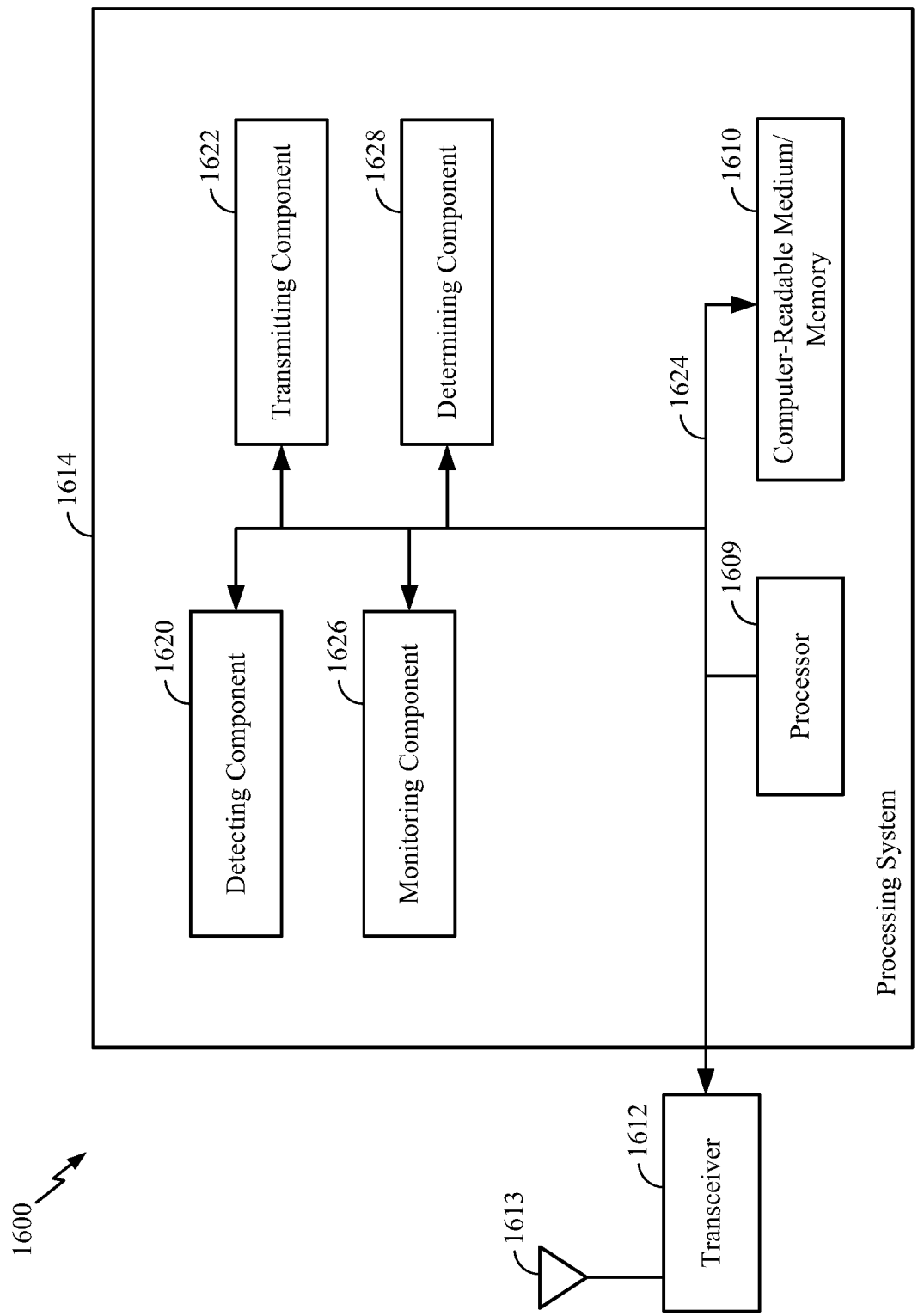
FIG. 16 illustrates a communications device that may include various components configured to perform operations for the techniques disclosed herein, such as one or more of the operations illustrated in FIG. 10.

FIG. 16 illustrates a wireless communications device 1600 (the victim BS corresponding to FIG. 10) that may include various components (e.g., corresponding to means-plus-function components) configured to perform operations for the techniques disclosed herein, such as one or more of the operations illustrated in FIG. 10. The communications device 1600 includes a processing system 1614 coupled to a transceiver 1612. The transceiver 1612 is configured to transmit and receive signals for the communications device 1600 via an antenna 1613. The processing system 1614 may be configured to perform processing functions for the communications device 1600, such as processing signals, etc.

The processing system 1614 includes a processor 1609 coupled to a computer-readable medium/memory 1610 via a bus 1624. In certain aspects, the computer-readable medium/ memory 1610 is configured to store instructions that when executed by processor 1609, cause the processor 1609 to perform one or more of the operations illustrated in FIG. 10, or other operations for performing the various techniques discussed herein.

In certain aspects, the processing system 1614 further includes a detecting component 1620 for performing one or more of the operations illustrated at 1002 in FIG. 10. Additionally, the processing system 1614 includes a transmitting component 1622 for performing one or more of the operations illustrated at 1004 in FIG. 10. Additionally, the processing system 1614 includes a monitoring component 1626 for performing one or more of the operations illustrated at 1006 in FIG. 10. Additionally, the processing system 1614 includes a determining component 1628 for performing one or more of the operations illustrated at 1008 in FIG. 10.

The detecting component 1620, the transmitting component 1622, the monitoring component 1626, and the determining component 1628 may be coupled to the processor 1609 via bus 1624. In certain aspects, the detecting component 1620, the transmitting component 1622, the monitoring component 1626, and the determining component 1628 may be hardware circuits. In certain aspects, the detecting component 1620, the transmitting component 1622, the monitoring component 1626, and the determining component 1628 may be software components that are executed and run on processor 1609.

Figure 17:
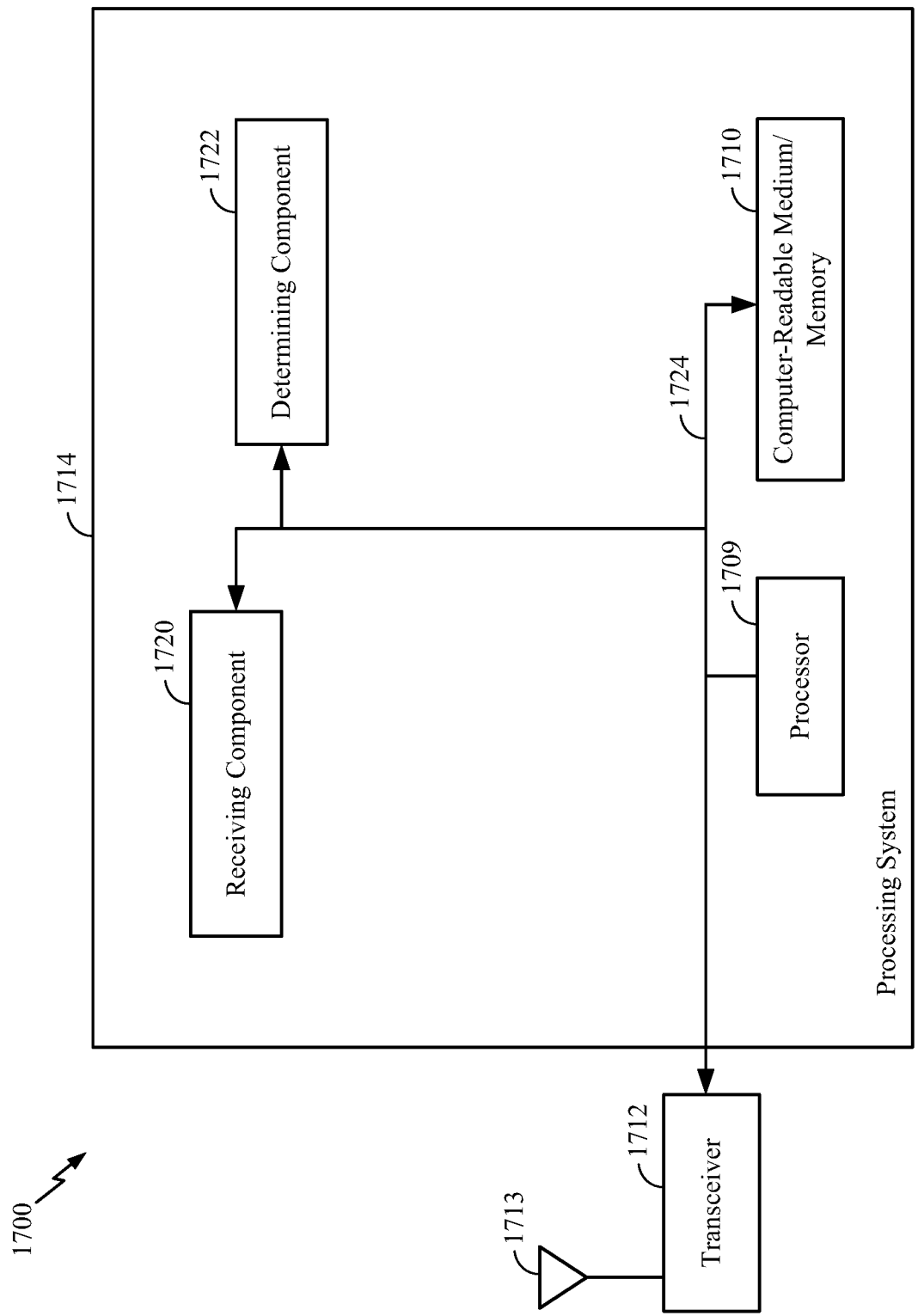
FIG. 17 illustrates a communications device that may include various components configured to perform operations for the techniques disclosed herein, such as one or more of the operations illustrated in FIG. 11.

FIG. 17 illustrates a wireless communications device 1700 (the aggressor BS corresponding to FIG. 11) that may include various components (e.g., corresponding to means-plus-function components) configured to perform operations for the techniques disclosed herein, such as one or more of the operations illustrated in FIG. 11. The communications device 1700 includes a processing system 1714 coupled to a transceiver 1712. The transceiver 1712 is configured to transmit and receive signals for the communications device 1700 via an antenna 1713. The processing system 1714 may be configured to perform processing functions for the communications device 1700, such as processing signals, etc.

The processing system 1714 includes a processor 1709 coupled to a computer-readable medium/memory 1710 via a bus 1724. In certain aspects, the computer-readable medium/memory 1710 is configured to store instructions that when executed by processor 1709, cause the processor 1709 to perform one or more of the operations illustrated in FIG. 11, or other operations for performing the various techniques discussed herein.

In certain aspects, the processing system 1714 further includes a receiving component 1720 for performing one or more of the operations illustrated at 1102 in FIG. 11. Additionally, the processing system 1714 includes a determining component 1722 for performing one or more of the operations illustrated at 1104 in FIG. 11.

The receiving component 1720 and the determining component 1722 may be coupled to the processor 1709 via bus 1724. In certain aspects, the receiving component 1720 and the determining component 1722 may be hardware circuits. In certain aspects, the receiving component 1720 and the determining component 1722 may be software components that are executed and run on processor 1709.

Figure 18:
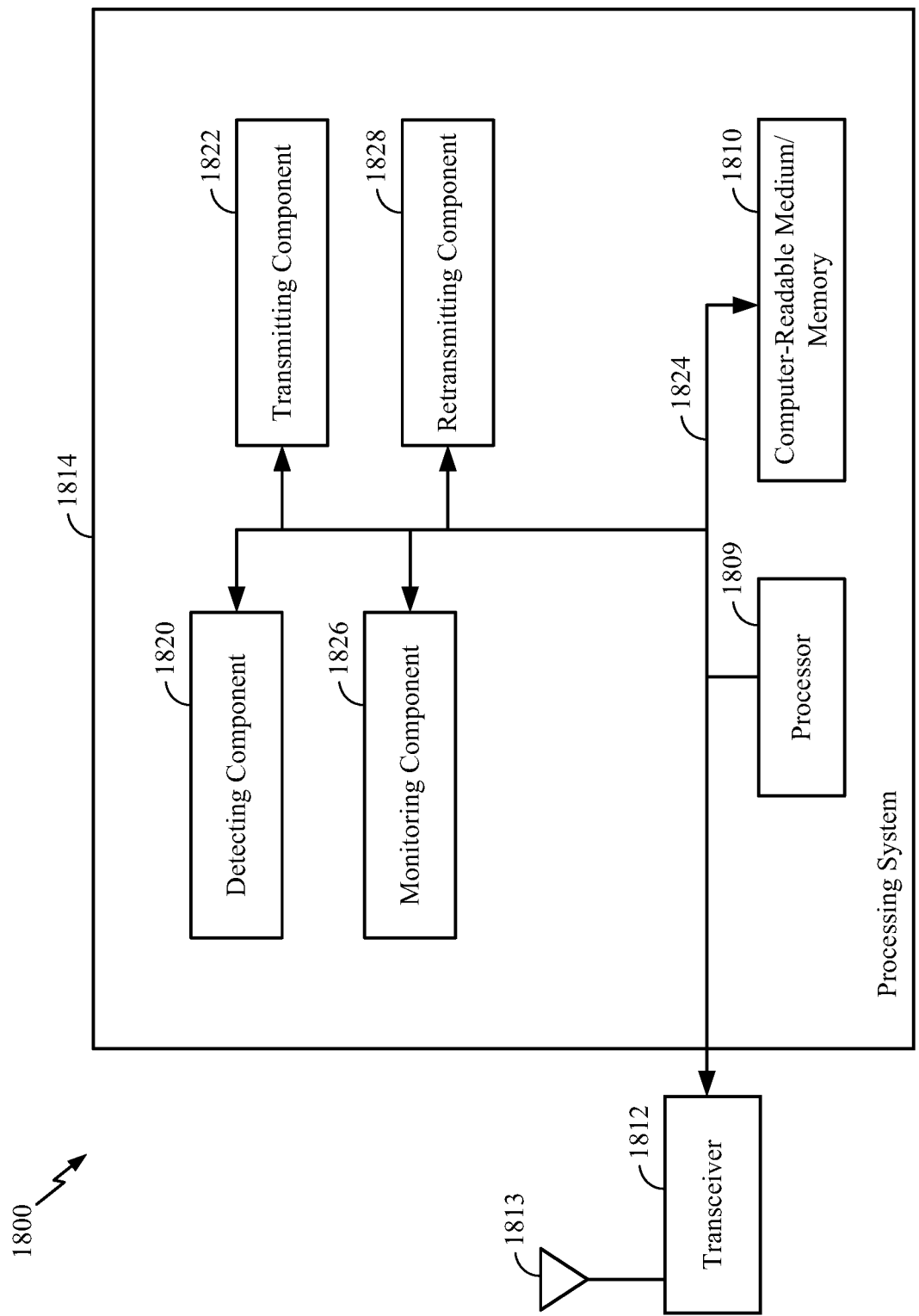
FIG. 18 illustrates a communications device that may include various components configured to perform operations for the techniques disclosed herein, such as one or more of the operations illustrated in FIG. 14.

FIG. 18 illustrates a wireless communications device 1800 (the victim BS corresponding to FIG. 14) that may include various components (e.g., corresponding to means-plus-function components) configured to perform operations for the techniques disclosed herein, such as one or more of the operations illustrated in FIG. 14. The communications device 1800 includes a processing system 1814 coupled to a transceiver 1812. The transceiver 1812 is configured to transmit and receive signals for the communications device 1800 via an antenna 1813. The processing system 1814 may be configured to perform processing functions for the communications device 1800, such as processing signals, etc.

The processing system 1814 includes a processor 1809 coupled to a computer-readable medium/memory 1810 via a bus 1824. In certain aspects, the computer-readable medium/memory 1810 is configured to store instructions that when executed by processor 1809, cause the processor 1809 to perform one or more of the operations illustrated in FIG. 14, or other operations for performing the various techniques discussed herein.

In certain aspects, the processing system 1814 further includes a detecting component 1820 for performing one or more of the operations illustrated at 1402 in FIG. 14. Additionally, the processing system 1814 includes a transmitting component 1822 for performing one or more of the operations illustrated at 1404 in FIG. 14. Additionally, the processing system 1814 includes a monitoring component 1826 for performing one or more of the operations illustrated at 1406 in FIG. 14. Additionally, the processing system 1814 includes a retransmitting component 1828 for performing one or more of the operations illustrated at 1408 in FIG. 14.

The detecting component 1820, the transmitting component 1822, the monitoring component 1826, and the retransmitting component 1828 may be coupled to the processor 1809 via bus 1824. In certain aspects, the detecting component 1820, the transmitting component 1822, the monitoring component 1826, and the retransmitting component 1828 may be hardware circuits. In certain aspects, the detecting component 1820, the transmitting component 1822, the monitoring component 1826, and the retransmitting component 1828 may be software components that are executed and run on processor 1809.

Figure 19:
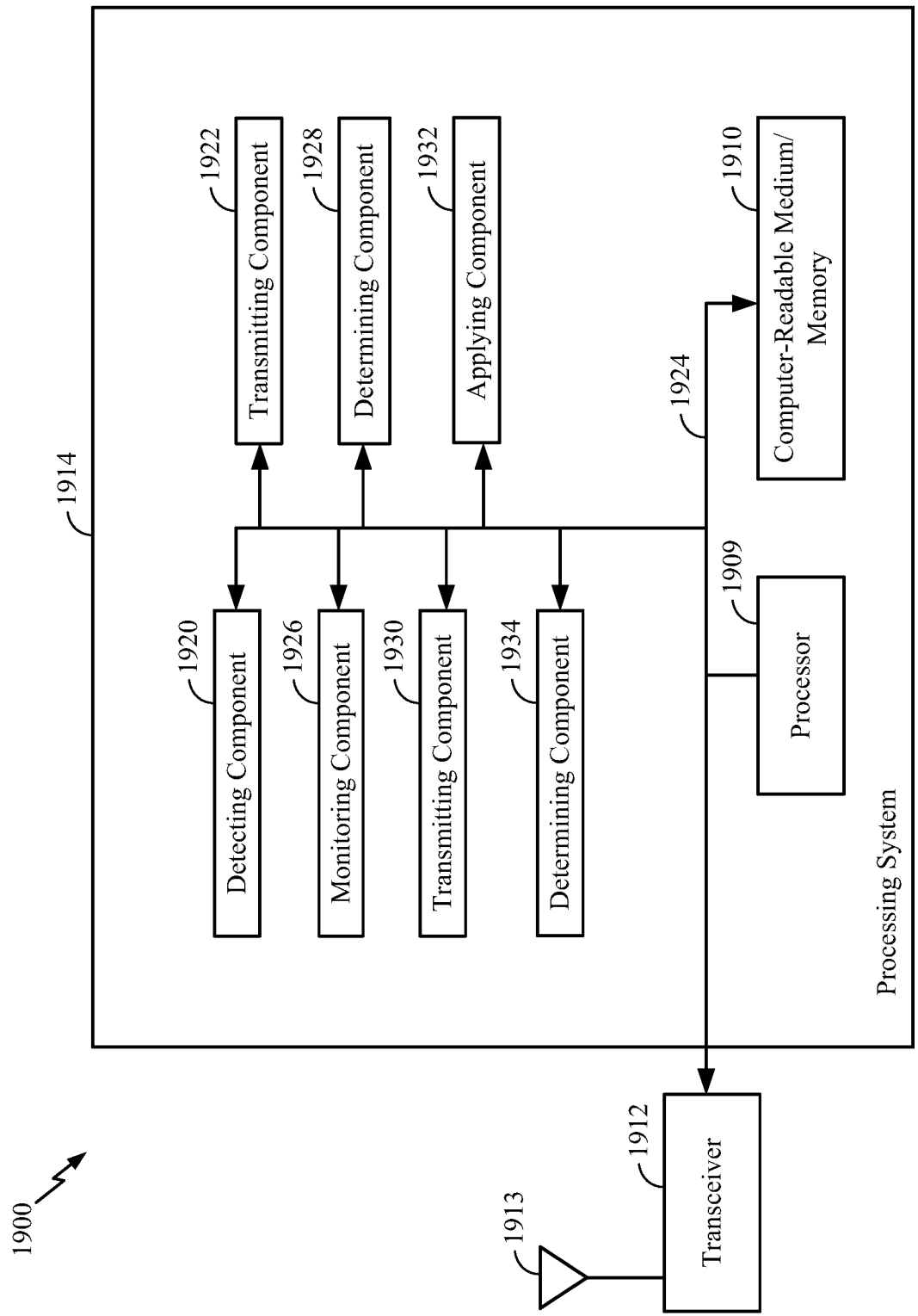
FIG. 19 illustrates a communications device that may include various components configured to perform operations for the techniques disclosed herein, such as one or more of the operations illustrated in FIG. 15.

FIG. 19 illustrates a wireless communications device 1900 (the victim BS corresponding to FIG. 15) that may include various components (e.g., corresponding to means-plus-function components) configured to perform operations for the techniques disclosed herein, such as one or more of the operations illustrated in FIG. 15. The communications device 1900 includes a processing system 1914 coupled to a transceiver 1912. The transceiver 1912 is configured to transmit and receive signals for the communications device 1900 via an antenna 1913. The processing system 1914 may be configured to perform processing functions for the communications device 1900, such as processing signals, etc.

The processing system 1914 includes a processor 1909 coupled to a computer-readable medium/memory 1910 via a bus 1924. In certain aspects, the computer-readable medium/memory 1910 is configured to store instructions that when executed by processor 1909, cause the processor 1909 to perform one or more of the operations illustrated in FIG. 15, or other operations for performing the various techniques discussed herein.

In certain aspects, the processing system 1914 further includes a detecting component 1920 for performing one or more of the operations illustrated at 1502 in FIG. 15. Additionally, the processing system 1914 includes a transmitting component 1922 for performing one or more of the operations illustrated at 1504 in FIG. 15. Additionally, the processing system 1914 includes a monitoring component 1926 for performing one or more of the operations illustrated at 1506 in FIG. 15. Additionally, the processing system 1914 includes a determining component 1928 for performing one or more of the operations illustrated at 1508 in FIG. 15. Additionally, the processing system 1914 includes a transmitting component 1930 for performing one or more of the operations illustrated at 1514 in FIG. 15. Additionally, the processing system 1914 includes an applying component 1932 for performing one or more of the operations illustrated at 1512 in FIG. 15. Additionally, the processing system 1914 includes a determining component 1934 for performing one or more of the operations illustrated at 1510 in FIG. 15.

The detecting component 1920, the transmitting component 1922, the monitoring component 1926, and the determining component 1928, transmitting component 1930, applying component 1932, and determining component 1934 may be coupled to the processor 1909 via bus 1924. In certain aspects, the detecting component 1920, the transmitting component 1922, the monitoring component 1926, and the determining component 1928, transmitting component 1930, applying component 1932, and determining component 1934 may be hardware circuits. In certain aspects, the detecting component 1920, the transmitting component 1922, the monitoring component 1926, and the determining component 1928, transmitting component 1930, applying component 1932, and determining component 1934 may be software components that are executed and run on processor 1909.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations (e.g., operations described in FIGS. 10-11 and 14-15) described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a victim base station (BS), comprising:
   detecting interference from aggressor BSs;
   transmitting distinguishable victim reference signals (RSs) to the aggressor BSs;
   monitoring for distinguishable aggressor RSs from the aggressor BSs, each of the distinguishable aggressor RSs being transmitted in response to a corresponding one of the distinguishable victim RSs; and
   determining to stop transmitting one or more of the distinguishable victim RSs based on the monitoring, wherein distinguishable victim RS transmissions to one of the aggressor BSs are stopped based on detection that distinguishable aggressor RS transmissions from the one of the aggressor BSs have stopped.

2. The method of claim 1, further comprising:
   determining that at least one of the aggressor BSs has not received a corresponding one of the distinguishable victim RSs if a corresponding distinguishable aggressor RS is not received; and
   in response, retransmitting the corresponding distinguishable victim RS using a coverage extension mechanism.

3. The method of claim 2, wherein the coverage extension mechanism involves increasing a transmission power for the retransmitting.

4. The method of claim 2, wherein the coverage extension mechanism involves increasing a transmission power for the retransmitting based on a residual interference level.

5. The method of claim 2, wherein the coverage extension mechanism involves requesting one or more other victim BSs to transmit the corresponding distinguishable victim RS at the same time as the retransmitting.

6. The method of claim 2, wherein the coverage extension mechanism involves a time domain repetition of the corresponding distinguishable victim RS during the retransmitting.

7. The method of claim 2, wherein the coverage extension mechanism involves allocating at least one of more time resources or more frequency resources for the retransmitting of the corresponding distinguishable victim RS.

8. The method of claim 1, wherein the distinguishable victim RSs are transmitted by the victim BS during a last one or more symbols of one or more downlink subframes.

9. The method of claim 1, wherein at least one of the distinguishable aggressor RSs is received from at least one of the aggressor BSs during a last one or more symbols of one or more adjusted downlink subframes.

10. The method of claim 1, wherein each of the distinguishable victim RSs comprises at least one of a cell or a group specific sequence and a distinguishable aggressor sequence.

11. The method of claim 10, wherein:
one of the distinguishable aggressor RSs corresponds to one of the distinguishable victim RSs; and
the distinguishable aggressor RS comprises a scrambled form of a corresponding distinguishable aggressor sequence of the distinguishable victim RS.

12. The method of claim 1, wherein each of the distinguishable victim RSs comprises at least one of a cell or a group specific sequence and a distinguishable spatial precoding or beamforming vector.

13. The method of claim 12, wherein:
one of the distinguishable aggressor RSs corresponds to one of the distinguishable victim RSs; and
the distinguishable aggressor RS comprises a scrambled form of a corresponding distinguishable spatial precoding or beamforming vector of the distinguishable victim RS.

14. The method of claim 1, wherein the one or more aggressor BSs are experiencing or have experienced interference caused by the victim BS.

15. The method of claim 1, wherein the distinguishable victim RS transmissions to the one of the aggressor BSs are stopped while continuing distinguishable victim RS transmissions to another one of the aggressor BSs.

16. A method of wireless communications by an aggressor base station (BS), comprising:
detecting a distinguishable victim reference signal (RS) from a victim BS that is experiencing or has experienced interference from aggressor BSs, wherein the distinguishable victim RS is one of multiple distinguishable victim RSs transmitted by the victim BS; and
transmitting a distinguishable aggressor RS to the victim BS to indicate detection of the distinguishable victim RS, wherein the distinguishable aggressor RS is one of multiple distinguishable aggressor RSs transmitted in response to a corresponding one of the multiple distinguishable victim RSs, wherein transmissions of the one of the multiple distinguishable victim RSs from the victim BS are stopped based on detection that transmissions of the distinguishable aggressor RS from the aggressor BS have stopped.

17. The method of claim 16, further comprising:
monitoring for the distinguishable victim RS after transmitting the distinguishable aggressor RS; and
determining to stop transmitting the distinguishable aggressor RS if the distinguishable victim RS is no longer detected.

18. The method of claim 16, wherein the distinguishable victim RS is received during a last one or more symbols of one or more downlink subframes of the victim BS.

19. The method of claim 16, wherein the distinguishable aggressor RS is transmitted by the aggressor BS during a last one or more symbols of one or more adjusted downlink subframes.

20. The method of claim 19, wherein transmitting the distinguishable aggressor RS further comprises:
muting downlink transmission of the aggressor BS after the last one or more symbols and prior to a gap period.

21. The method of claim 16, wherein the distinguishable victim RS comprises at least one of a cell or a group specific sequence and a distinguishable aggressor sequence corresponding to the aggressor BS.

22. The method of claim 21, wherein the distinguishable aggressor RS comprises a scrambled form of the distinguishable aggressor sequence.

23. The method of claim 16, wherein the distinguishable victim RS comprises at least one of a cell or a group specific sequence and a distinguishable spatial precoding or beamforming vector corresponding to the aggressor BS.

24. The method of claim 23, wherein the distinguishable aggressor RS comprises a scrambled form of the distinguishable spatial precoding or beamforming vector.

25. The method of claim 16, wherein the aggressor BS is experiencing or has experienced interference caused by the victim BS.

26. A method of wireless communications by a victim base station (BS), comprising:
detecting interference associated with one or more aggressor BSs;
transmitting at least one victim reference signal (RS) in response to detecting the interference;
monitoring for an aggressor RS sent by one of the aggressor BSs in response to the at least one victim RS; and
retransmitting the at least one victim RS using a coverage extension mechanism if the aggressor RS is not detected, wherein the coverage extension mechanism involves requesting one or more other victim BSs to transmit the victim RS at the same time as the retransmitting of the at least one victim RS by the victim BS.

27. The method of claim 26, wherein the coverage extension mechanism involves increasing a transmission power for the retransmitting.

28. The method of claim 26, wherein the coverage extension mechanism involves increasing a transmission power for the retransmitting based on a residual interference level.

29. The method of claim 26, wherein the coverage extension mechanism involves a time domain repetition of the victim RS during the retransmitting.

30. The method of claim 26, wherein the coverage extension mechanism involves allocating at least one of more time resources or more frequency resources for the retransmitting of the victim RS.

31. An apparatus for wireless communications by a victim base station (BS), comprising:
memory; and
one or more processors coupled to the memory, the one or more processors, individually or collectively, configured to cause the apparatus to:
detect interference from aggressor BSs;
transmit distinguishable victim reference signals (RSs) to the aggressor BSs;
monitor for distinguishable aggressor RSs from the aggressor BSs, each of the distinguishable aggressor RSs being transmitted in response to a corresponding one of the distinguishable victim RSs; and
determine to stop transmitting one or more of the distinguishable victim RSs based on the monitoring, wherein distinguishable victim RS transmissions to one of the aggressor BSs are stopped based on detection that distinguishable aggressor RS transmissions from the one of the aggressor BSs have stopped.

32. An apparatus for wireless communications by an aggressor base station (BS), comprising:
- memory; and
- one or more processors coupled to the memory, the one or more processors, individually or collectively, configured to cause the apparatus to:
  - detect a distinguishable victim reference signal (RS) from a victim BS that is experiencing or has experienced interference from aggressor BSs, wherein the distinguishable victim RS is one of multiple distinguishable victim RSs transmitted by the victim BS; and
  - transmit a distinguishable aggressor RS to the victim BS to indicate detection of the distinguishable victim RS, wherein the distinguishable aggressor RS is one of multiple distinguishable aggressor RSs transmitted in response to a corresponding one of the multiple distinguishable victim RSs, wherein transmissions of the one of the multiple distinguishable victim RSs from the victim BS are stopped based on detection that transmissions of the distinguishable aggressor RS from the aggressor BS have stopped.

33. An apparatus for wireless communications by a victim base station (BS), comprising:
- memory; and
- one or more processors coupled to the memory, the one or more processors, individually or collectively, configured to cause the apparatus to:
  - detect interference associated with one or more aggressor BSs;
  - transmit at least one victim reference signal (RS) in response to detecting the interference;
  - monitor for an aggressor RS sent by one of the aggressor BSs in response to the at least one victim RS; and
  - retransmit the at least one victim RS using a coverage extension mechanism if the aggressor RS is not detected, wherein the coverage extension mechanism involves requesting one or more other victim BSs to transmit the victim RS at the same time as the retransmitting of the at least one victim RS by the victim BS.

* * * * *